United States Patent [19]
Meron et al.

[11] Patent Number: 5,640,687
[45] Date of Patent: Jun. 17, 1997

[54] BACKSCATTERING TRANSPONDER SWITCHABLE BETWEEN A MODULATOR/ DEMODULATOR AND GROUND

[75] Inventors: Peretz Meron, Tel Aviv; David Mahlab, Kiryat Ono; Dan Cohen, Givatayim; Yonina Rosen, Tel Aviv; Arie Reichman, Kfar Saba; Reuven Ianconescu, Tel Aviv; Moshe Yarom, Maccabim, all of Israel

[73] Assignee: Tadiran Ltd., Holon, Israel

[21] Appl. No.: 246,872

[22] Filed: May 20, 1994

[30] Foreign Application Priority Data

May 24, 1993 [IL] Israel ............................... 105796

[51] Int. Cl.⁶ ................................................... H04B 1/44
[52] U.S. Cl. .......................... 455/83; 375/315; 455/107
[58] Field of Search ........................ 340/825.54, 928, 340/942; 235/384; 455/78–79, 82–83, 106–107; 375/219, 222, 268, 300, 315

[56] References Cited

U.S. PATENT DOCUMENTS

| | | |
|---|---|---|
| 4,075,632 | 2/1978 | Baldwin et al. . |
| 4,897,642 | 1/1990 | DiLullo et al. . |
| 5,293,399 | 3/1994 | Hefti ........................... 375/219 |
| 5,307,349 | 4/1994 | Shloss et al. ............. 340/825.54 |
| 5,313,211 | 5/1994 | Tokuda et al. .............. 455/106 |

FOREIGN PATENT DOCUMENTS 2234140  1/1991  United Kingdom .

OTHER PUBLICATIONS

Rittich, D., et al., "Future Automatic Toll Registration for the Road Traffic", Sondderdruck aus ntz Bd. 46 (1993), Heft 4.

Ernst, S.J., "Amplitude Shift Keying (Ask) or On/Off (OOK)", Receiving Systems Design, Artech, 1984.

Primary Examiner—Reinhard J. Eisenzopf
Assistant Examiner—Marsha D. Banks-Harold
Attorney, Agent, or Firm—Darby & Darby

[57] ABSTRACT

An electronic toll system for monitoring a plurality of lanes including a plurality of lane monitoring devices operative to monitor passage of vehicles through the corresponding plurality of lanes, and a lane monitoring device coordinating system for coordinating operation of the lane monitoring devices such that not all of the lane monitoring devices operate simultaneously.

3 Claims, 17 Drawing Sheets

| | 1 | 2 | 3 | 4 | 5 | 6 | 7 | 8 | 9 | BALANCE | CREDIT CARD NO. |
|---|---|---|---|---|---|---|---|---|---|---|---|
| 1 | X | | | | | | | | | 10$ | |
| 2 | | | | X | | | | | | 13$ | |
| 3 | | | | | | | X | | | 24$ | |
| 4 | | | X | | | | | | | 15$ | |
| 5 | | | | | | X | | | | 80$ | |
| 6 | | | | | | | | | X | 0$ | |
| 7 | | X | | | | | | | | 20$ | |
| 8 | | | | | X | | | | | 10$ | |
| 9 | | X | | | | | | | | 25$ | |
| 10 | | | X | | | | | | | 22$ | |
| 11 | | | | | | | | X | | 10$ | |
| 12 | | | | | | | | | | 100$ | |
| 13 | | | | | | X | | | | 50$ | |
| 14 | | | | | | | X | | | 75$ | |
| 15 | | | | | X | | | | | 70$ | |
| 16 | | | | | X | | | | | 15$ | |
| 17 | | | X | | | | | | | 25$ | |
| 18 | | | | | X | | | | | 45$ | |
| 19 | | | | | | | | | | 35$ | |
| 20 | | | | | | | X | | | 55$ | |
| 21 | | | | | X | | | | | 40$ | |
| 22 | | | | X | | | | | | 60$ | |
| 23 | | X | | | | | | | | 72$ | |
| 24 | | | | | | | | | | 28$ | |
| 25 | | | | | | | | X | | 95$ | |

520

↕

512 — COMMUNICATION WITH LOCAL VEHICLE PASSAGE MONITOR

BACKSCATTERING TRANSPONDER SWITCHABLE BETWEEN A MODULATOR/ DEMODULATOR AND GROUND

FIELD OF THE INVENTION

The present invention relates to apparatus and methods for electronic monitoring of vehicles and to apparatus and methods for electronic levying for services.

BACKGROUND OF THE INVENTION

Vehicles employ a number of facilities, such as road side parking, parking in lots and toll roads, which are available for a fee. Electronic toll systems are known which monitor use of such facilities by vehicles so as to compute and levy an appropriate fee.

A state of the art electronic toll system is described by Dieter Rittich and Konrad Zurmuhl in "Zukunftige Automatische Gebuhrenerfassung fur den StraBenverkehr", Sonderdruck aus ntz Bd. 46 (1993), Heft 4. The Rittich et al system employs the ALOHA data communication protocol in order to provide periodic transmission to a vehicle tag at a randomly determined point of time within each period.

U.S. Pat. No. 4,075,632 to Baldwin et al describes a backscattering tag in which the antenna, when in transmitting mode, is switched between the ground and an open circuit.

SUMMARY OF THE INVENTION

The present invention seeks to provide an improved system for automatically monitoring use of pay facilities by vehicles. More generally, the present invention seeks to provide an automatic levying system for automatically monitoring use of any toll facility. The term "toll" or "toll facility" is used herein very generally to refer to any service which is paid for by each of a plurality of users on the basis of the number of times the service is utilized by each user. Examples of this type of service might be a video cassette lending service, a pay television service, a cinema chain serving subscribers, each of which purchases a tag, or an amusement park or chain of amusement parks serving subscribers, each of which purchases a tag.

There is thus provided in accordance with a preferred embodiment of the present invention an electronic toll system for monitoring a plurality of lanes including a plurality of lane monitoring devices operative to monitor passage of vehicles through the corresponding plurality of lanes, and a lane monitoring device coordinating system for coordinating operation of the lane monitoring devices such that not all of the lane monitoring devices operate simultaneously.

Further in accordance with a preferred embodiment of the present invention the lane monitoring device coordinating system is operative to coordinate operation of the lane monitoring devices such that adjacent lane monitoring devices do not operate simultaneously.

Still further in accordance with a preferred embodiment of the present invention the lane monitoring device coordinating system is operative to coordinate activity of vehicle toll tags such that vehicle toll tags interacting with adjacent lane monitoring devices do not operate simultaneously.

Additionally provided in accordance with a preferred embodiment of the present invention is an electronic toll device for monitoring a lane including a receiver operative to receive a transmission from a passing vehicle, and a transmitter associated with a vehicle which is operative to transmit a transmission for reception by the toll receiver, wherein the transmitter is operative to transmit, during a first period of time, according to a first decision basis and subsequently to transmit on a second decision basis.

Also provided in accordance with a preferred embodiment of the present invention is an electronic toll system including a memory storing the following information for each of a multiplicity of vehicles: a plurality of account identification codes, and an indication of a current account identification code, a receiver operative to receive the account identification code of an individual one of the multiplicity of vehicles which has passed through an individual toll station, and index updating apparatus operative to advance the index after reception of the account identification code corresponding thereto.

There is further provided in accordance with a preferred embodiment of the present invention a tag including a memory storing a plurality of account identification codes, an index corresponding to a current one of the plurality of account identification codes, a transmitter operative to transmit the individual account identification code, and index updating apparatus operative to advance the index after transmission of the account identification code corresponding thereto.

There is still further provided in accordance with a preferred embodiment of the present invention a system for communication between a toll station and a passing vehicle including an optical transmitter operative to transmit an optical signal to a vehicle toll tag.

There is additionally provided in accordance with a preferred embodiment of the present invention a tag including an optical signal receiver, arranged to be disposed within a vehicle, which is operative to receive an optical signal transmitted by a toll station.

Further in accordance with a preferred embodiment of the present invention the system includes a plurality of optical signal receivers, arranged to be disposed within a corresponding plurality of vehicles, which are operative to receive an optical signal transmitted by the optical transmitter.

Additionally in accordance with a preferred embodiment of the present invention the transmitter includes a transponder.

There is also provided in accordance with a preferred embodiment of the present invention a toll reader including a digital data source, a Manchester coded data source operative to provide a Manchester coding of data provided by the digital data source, an oscillator operative to generate an RF carrier signal which is in a first state when a data bit received by the oscillator from the digital data source is "1" and in a second state, whose phase is shifted 180 degrees relative to the phase of the first state, when a data bit received by the oscillator from the digital data source is "0", and an ASK Manchester coded modulator operative to multiply the output of the oscillator by the output of the Manchester coded data source, thereby to provide an ASK Manchester coded signal for reception by a unipolar ASK Manchester coded vehicle toll tag.

Further in accordance with a preferred embodiment of the present invention the apparatus includes an RF transmitter operative to transmit the ASK Manchester coded signal.

Still further in accordance with a preferred embodiment of the present invention the system includes an RF transmitter operative to transmit an RF signal to a vehicle toll tag.

There is additionally provided in accordance with a preferred embodiment of the present invention an electronic levying system including a memory storing the following information for each of a multiplicity of subscribers to a service: a plurality of account identification codes, and an indication of a current account identification code, a receiver operative to receive the account identification code of an individual one of the multiplicity of subscribers which has passed through an individual service providing station, and index updating apparatus operative to advance the index after reception of the account identification code corresponding thereto.

Further provided in accordance with a preferred embodiment of the present invention is an electronic monitoring device including a receiver operative to receive a transmission from a passing subscriber to a service, and a transmitter operative to transmit a transmission for reception by the toll receiver, wherein the transmitter is operative to transmit, during a first period of time, according to a first decision basis and subsequently to transmit on a second decision basis.

There is still further provided in accordance with a preferred embodiment of the present invention a method for electronically monitoring a plurality of lanes, the method including providing a plurality of lane monitoring devices operative to monitor passage of vehicles through the corresponding plurality of lanes, and coordinating operation of the lane monitoring devices such that not all of the lane monitoring devices operate simultaneously.

There is additionally provided in accordance with a preferred embodiment of the present invention a method for electronically monitoring a lane, the method including receiving a transmission from a passing vehicle, and transmitting a transmission for reception by the toll receiver, on a first decision basis during a first period of time and subsequently on a second decision basis.

Further provided in accordance with a preferred embodiment of the present invention is a method for electronic levying including storing the following information for each of a multiplicity of vehicles: a plurality of account identification codes, and an indication of a current account identification code, receiving the account identification code of an individual one of the multiplicity of vehicles which has passed through an individual toll station, and advancing the index after reception of the account identification code corresponding thereto.

There is still further provided in accordance with a preferred embodiment of the present invention a method for electronic levying including storing a plurality of account identification codes, providing an index corresponding to a current one of the plurality of account identification codes, transmitting the individual account identification code, and advancing the index after transmission of the account identification code corresponding thereto.

Additionally provided in accordance with a preferred embodiment of the present invention is a method for communication between a toll station and a passing vehicle including transmitting an optical signal from a toll station to a vehicle toll tag.

There is also provided in accordance with a preferred embodiment of the present invention a method for communication between a toll station and a passing vehicle including an optical signal receiver, arranged to be disposed within a vehicle, which is operative to receive an optical signal transmitted by a toll station.

Further provided in accordance with a preferred embodiment of the present invention is a toll reading method including providing a Manchester coded data source operative to provide a Manchester coding of data provided by a digital data source, generating an RF carrier signal which is in a first state when a data bit received by the oscillator from the digital data source is "1" and in a second state, whose phase is shifted 180 degrees relative to the phase of the first state, when a data bit received by the oscillator from the digital data source is "0", and multiplying the output of the oscillator by the output of the Manchester coded data source, thereby to provide an ASK Manchester coded signal for reception by a unipolar ASK Manchester coded vehicle toll tag.

There is still further provided in accordance with a preferred embodiment of the present invention an electronic levying method including storing the following information for each of a multiplicity of subscribers to a service: a plurality of account identification codes, and an indication of a current account identification code, receiving the account identification code of an individual one of the multiplicity of subscribers which has passed through an individual service providing station, and advancing the index after reception of the account identification code corresponding thereto.

Additionally provided in accordance with a preferred embodiment of the present invention is an electronic monitoring method including receiving a transmission from a passing subscriber to a service, and transmitting a transmission for reception by the toll receiver, wherein the transmitter is operative to transmit, during a first period of time, on a first decision basis and subsequently to transmit on a second decision basis, different from the first decision basis.

There is also provided in accordance with a preferred embodiment of the present invention an electronic toll device for monitoring a lane including a receiver operative to receive a transmission from a passing vehicle, and a transmitter associated with a vehicle which is operative to transmit a transmission for reception by the toll receiver, wherein the transmitter is operative to transmit or not transmit, on each of a plurality of occasions, on a probabilistic basis and independently of whether the transmitter transmits or does not transmit on the remaining occasions.

There is further provided in accordance with a preferred embodiment of the present invention an electronic monitoring device including a receiver operative to receive a transmission from a passing subscriber to a service, and a transmitter operative to transmit a transmission for reception by the toll receiver, wherein the transmitter is operative to transmit or not transmit, on each of a plurality of occasions, on a probabilistic basis and independently of whether the transmitter transmits or does not transmit on the remaining occasions.

Further provided in accordance with a preferred embodiment of the present invention is a method for monitoring a lane including receiving a transmission from a passing vehicle, and providing a transmitter associated with a vehicle which is operative to transmit a transmission for reception by the toll receiver, wherein the transmitter is operative to transmit or not transmit, on each of a plurality of occasions, on a probabilistic basis and independently of whether the transmitter transmits or does not transmit on the remaining occasions.

There is still further provided in accordance with a preferred embodiment of the present invention a method for monitoring use of a service including receiving a transmission from a passing subscriber to a service, and transmitting a transmission for reception by the toll receiver, wherein the transmitter is operative to transmit or not transmit, on each of a plurality of occasions, on a probabilistic basis and independently of whether the transmitter transmits or does not transmit on the remaining occasions.

Additionally in accordance with a preferred embodiment of the present invention the transmitter is operative to transmit, during a first period of time, on a deterministic basis and subsequently to transmit on a probabilistic basis.

Also in accordance with a preferred embodiment of the present invention the transmitter is operative to transmit, during a first period of time, at a first probability corresponding to the first decision basis and subsequently to transmit at a second probability corresponding to the second decision basis.

There is further provided in accordance with a preferred embodiment of the present invention a method for electronically monitoring a plurality of lanes, the method including providing a plurality of lane monitoring devices operative to monitor passage of individuals through the corresponding plurality of lanes, and coordinating operation of the lane monitoring devices such that not all of the lane monitoring devices operate simultaneously.

There is still further provided in accordance with a preferred embodiment of the present invention a backscattering transponder including a modulator/demodulator, an antenna operative to transmit modulated data generated by the modulator/demodulator, and antenna switching apparatus which switches the antenna between the modulator/demodulator and the ground such that when the antenna is in receiving mode, the antenna is connected to the modulator/demodulator and such that, when the antenna is in transmitting mode, the antenna is switched between the modulator/demodulator and the ground according to the modulated data.

Further in accordance with a preferred embodiment of the present invention the antenna switching apparatus includes at least one diode.

Additionally in accordance with a preferred embodiment of the present invention the antenna switching apparatus includes a single diode.

Also provided in accordance with a preferred embodiment of the present invention is an object monitoring system interacting with a sensor operative to sense a characteristic of the moving object, the system including a transponder associated with the moving object and including a receiver operative to receive the object characteristic from the sensor, and a transmitter operative to transmit the object characteristic, and an object monitor receiving the object characteristic from the transmitter.

Further in accordance with a preferred embodiment of the present invention the moving object includes a vehicle.

Still further in accordance with a preferred embodiment of the present invention the moving object includes an object to be treated by a production line which is moving along the conveyor of the production line.

BRIEF DESCRIPTION OF DRAWINGS

The present invention will be understood and appreciated from the following detailed description, taken in conjunction with the drawings in which:

FIG. 6 is a simplified functional block diagram of a central control unit of a vehicle service monitoring system constructed and operative in accordance with a preferred embodiment of the present invention;

DETAILED DESCRIPTION OF PREFERRED EMBODIMENTS

Figure 1:
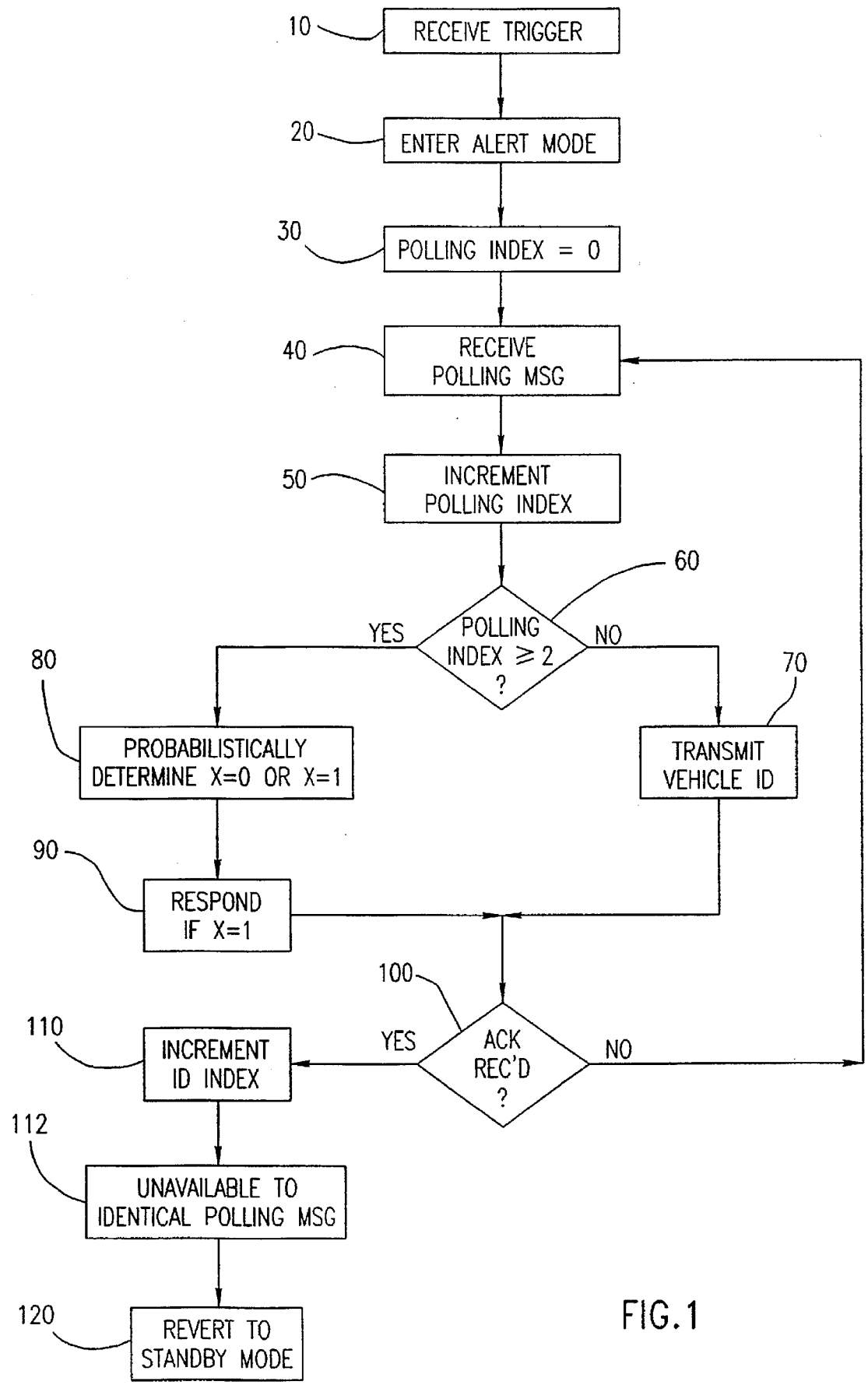
FIG. 1 is a simplified flowchart of a method carried out by a tag associated with a vehicle which forms part of a vehicle service monitoring system constructed and operative in accordance with a preferred embodiment of the present invention.
Figure 2:
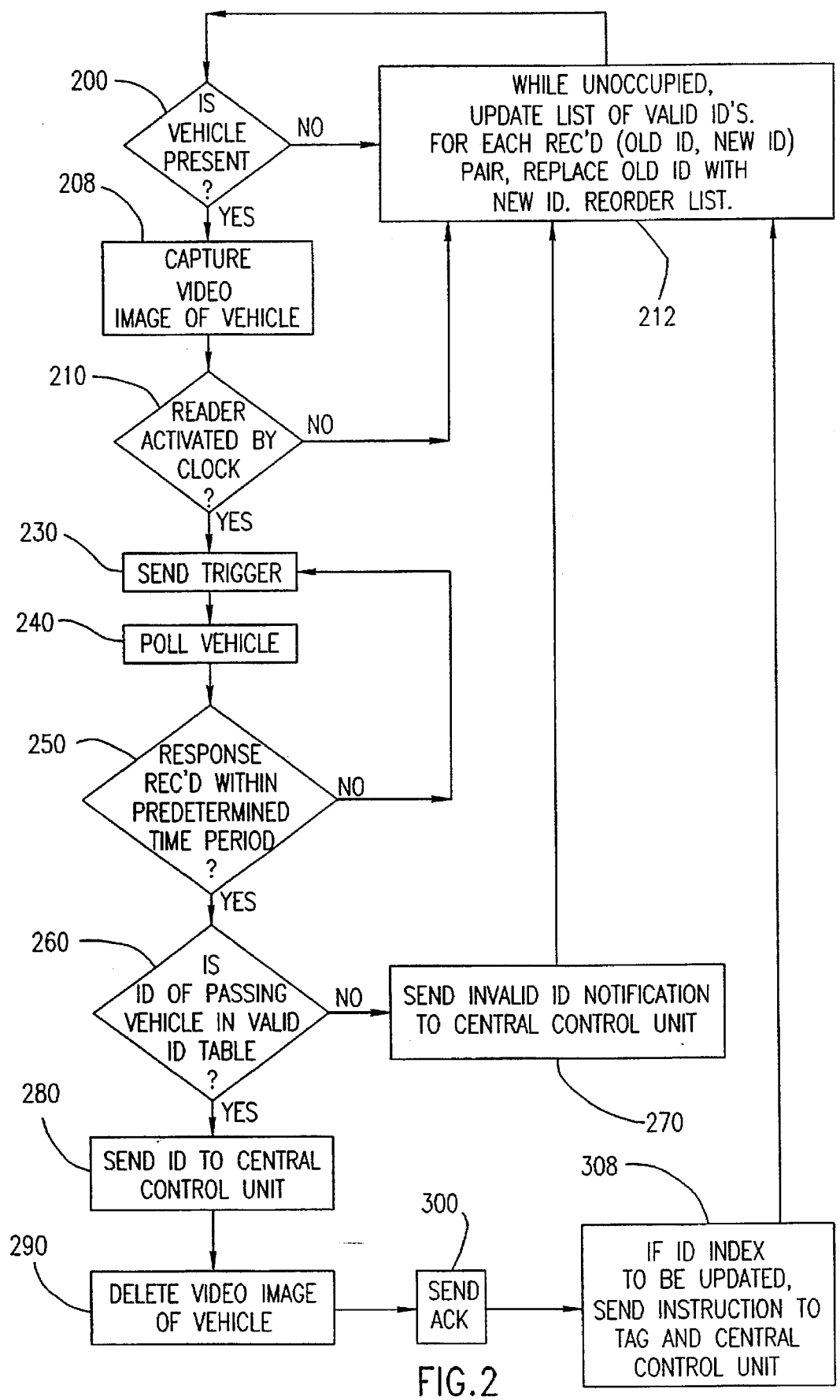
FIG. 2 is a simplified flowchart of a method carried out by a local monitor of vehicle passage which forms part of a vehicle service monitoring system constructed and operative in accordance with a preferred embodiment of the present invention.
Figure 3:
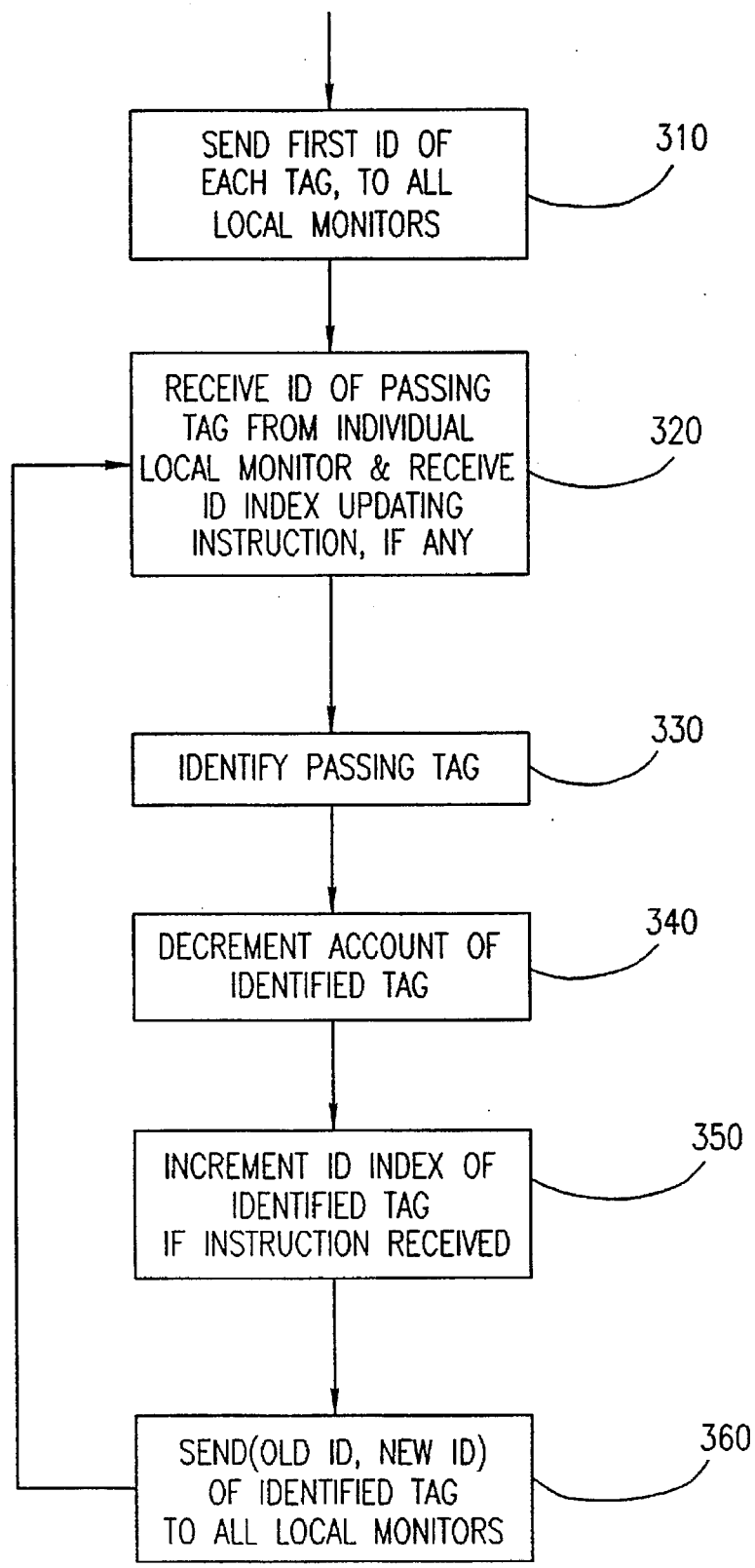
FIG. 3 is a simplified flowchart of a method carried out by a central control unit of a vehicle service monitoring system constructed and operative in accordance with a preferred embodiment of the present invention.

Reference is now made to FIGS. 1, 2 and 3 which illustrate a preferred method for monitoring a toll road so as to levy a fee on vehicles passing thereover. The steps illustrated in FIGS. 1, 2 and 3 are preferably performed by a tag associated with an account and disposed typically within or on a vehicle, a local vehicle passage monitor and a central control unit, respectively.

Reference is now made to FIG. 1 which is a simplified flowchart of a method carried out by a tag associated with an account to be debited for vehicle services and disposed in or on a vehicle, which forms part of a vehicle service monitoring system constructed and operative in accordance with a preferred embodiment of the present invention. The tag is preferably portable.

The method of FIG. 1 preferably comprises the following steps:

STEP 10: As the vehicle approaches a toll station at which is disposed a local vehicle passage monitor, the tag preferably receives at least one trigger from the local vehicle passage monitor, such as an RF trigger, an optical trigger, an optical trigger followed by an RF trigger or an RF trigger followed by an optical trigger.

STEP 20: As a result of receipt of the trigger, the tag enters into an alert mode in which it awaits polling.

Alternatively, step 10 may be omitted and the tag may be continually in an alert mode.

STEP 30: A polling index receives an initial value of zero.

STEP 40: The tag receives a polling message from the local vehicle passage monitor. If no polling message is received within a waiting period of predetermined length, the tag may return to its standby mode.

STEP 50: The polling index is incremented to indicate that the tag has been polled.

STEP 60: If the polling index is less than a predetermined integer such as 2, indicating that the tag has been polled less than a predetermined number of times, then:

STEP 70: The tag transmits an account identification code which identifies the account to which the services rendered to the vehicle are to be charged. It is appreciated that, if desired, more than one tag may be issued for a single account.

According to one embodiment of the present invention, the tag stores a single account identification code which is transmitted in step 70 and also in subsequent step 90 if X=1.

According to a preferred embodiment of the present invention, the tag stores a plurality of account identification codes, such as 500 randomly selected account identification codes. An ID index points to a currently valid one of the plurality of account identification codes and, in steps 70 and 90, the currently valid account identification code is transmitted.

Once (STEP 60) the polling index has reached the predetermined integer, indicating that the tag has been polled at least a predetermined number of times, such as at least twice, then the tag preferably transmits the current account identification code probabilistically. Using any suitable random process (STEP 80), the system generates a value of 0 or 1 for a random variable X which assumes the value of 0 with a predetermined probability of p and assumes the value of 1 with probability 1-p. The system transmits the current account identification code if X=1 but not if X=0 (STEP 90).

If the account identification code transmitted in step 70 or step 90 is acknowledged by the local vehicle passage monitor (STEP 100), then:

a. If the acknowledgement message received includes an instruction to increment the ID index, the ID index is incremented (STEP 110) so that when the tag is next polled, a different account identification code will be sent;

b. STEP 112: The vehicle tag now preferably becomes unavailable to any polling message identical to that just received thereby for a predetermined time period such as 10 seconds.

c. STEP 120: The alert mode is replaced by a standby mode, in which the tag remains until it is next triggered, in which case the method is performed again starting from STEP 10.

If the account identification code transmitted in step 70 or 90 is not acknowledged by the local vehicle passage monitor within a predetermined time period then the system may again await a polling message at which point it returns to step 40. Alternatively, if the code is not acknowledged, the system may revert to standby mode and awaits receipt of an additional trigger.

Preferably, steps 70 and 90 are carried out at a fixed, predetermined time, relative to step 10 in which a trigger is received.

The flowchart of FIG. 1 illustrates a preferred embodiment of the present invention in which the tag transmits the current account identification code deterministically in response to one or more initial pollings, and probabilistically in response to any subsequent pollings. More generally, the tag may transmit in accordance with a first decision basis in response to one or more initial pollings and in accordance with a second decision basis in response to one or more subsequent pollings, and, optionally, in accordance with other decision bases in response to subsequent respective sequences of one or more pollings. For example, initially, the tag may transmit in response to the first two pollings at a relatively high probability, such as p=0.9, then may transmit in response to the next three polling at a somewhat lower probability, such as p=0.7, and may transmit in response to all subsequent polling at a lower probability, such as p=0.4.

Alternatively, however, the tag may transmit deterministically for all pollings starting from the first, or probabilistically for all pollings starting from the first.

Preferably, the randomly arrived at decision of the tag as to whether or not to transmit in response to an individual polling does not depend on previous decisions to transmit or not transmit in response to previous pollings.

Reference is now made to FIG. 2 which is a simplified flowchart of a method carried out by a local monitor of vehicle passage which forms part of a vehicle service monitoring system constructed and operative in accordance with a preferred embodiment of the present invention. The local vehicle passage monitor preferably includes a vehicle presence sensor for each lane, an account identification code reader for each lane, a clock system operative to selectively activate the readers of the various lanes and a memory storing, for each of a multiplicity of tags, a current account identification code. For example, the clock may intermittently activate the readers in the oddly-numbered lanes and in the evenly-numbered lanes such that readers in adjacent lanes never operate simultaneously.

The method of FIG. 2 preferably comprises the following steps, performed separately for each lane:

a. Optionally, if the vehicle presence sensor indicates presence of a vehicle (STEP 200), then a video image of the vehicle is captured (STEP 208).

b. If the reader has been activated by the clock (STEP 210), then steps 230, 240, 250, 260, as well as step 270 or steps 280, 290, 300 and 308 are performed.

c. If the vehicle presence sensor indicates that no vehicle is present, or if a vehicle is indicated to be present but the reader is not activated, the reader is unoccupied. The system is operative, in parallel to carrying out the operations of the flowchart of FIG. 2, to receive updating interrupts including interrupts updating the valid ID's of one or more tags which have recently changed ID's and can update the balance. The interrupt typically comprises pairs of ID's from the central control unit. Each pair of ID's includes an old ID and a new ID. The system preferably takes advantage of unoccupied time (STEP 212) to read the received ID pairs on a first-come first-served basis, and, for each received pair, to update its list of ID's by removing the old ID and replacing it with the new ID. The system also preferably is operative to reorder the list such that, preferably, a predetermined sequence between the multiplicity of current ID's is maintained.

d. In STEP 230, the local vehicle passage monitor sends a trigger signal which is received by the tag of the passing vehicle, as described above with reference to FIG. 1.

e. In STEP 240, the tag of the passing vehicle is polled, in response to which the tag transmits its current account identification code, either probabilistically or deterministically, as described above with reference to FIG. 1.

f. In STEP 250, the system awaits the identification code. If it is not received within a predetermined time period, such as 100 microseconds, the system typically returns to step 230. If the identification code from the passing vehicle is received, step 260 is performed.

In STEP 260, the system determines whether the received identification code is included in its table of currently valid account identification codes. If not (STEP 270), the system preferably sends to the central control unit a notification that an invalid account identification code has been received.

If the identification code of the passing vehicle is valid, it is sent to the central control unit (STEP 280). Preferably, the video image of the passing vehicle is deleted (STEP 290), since the passage of the vehicle has been recorded by receipt of its identification code. In STEP 300, the system sends an acknowledgement for receipt by the tag of the passing vehicle.

In STEP 308, the system determines whether or not the ID index of the passing vehicle's tag should be updated. Typically, the ID index is updated after each passage of a vehicle through a toll station. However, if, for example, the local monitor is not currently able to communicate with the central unit, for whatever reason, the ID index typically will not be updated. If the ID index is to be updated, an instruction to increment the ID index of the tag is sent to both the tag and the central unit.

Reference is now made to FIG. 3 which is a simplified flowchart of a method carried out by a central control unit of a vehicle service monitoring system constructed and operative in accordance with a preferred embodiment of the present invention. The method of FIG. 3 preferably comprises the following steps:

STEP 310: Initially, the central unit sends a table to all local monitors which includes the current ID of each of a multiplicity of tags. If the system is being initialized, the table includes the first ID of each tag from among the multiplicity of tags. The central unit now awaits receipt of indications of vehicles passing through the various local monitors with which the central unit is associated (STEP 320).

In STEP 320, the central unit receives an indication of the ID of each passing vehicle. Also, if the local monitor has instructed the tag of the passing vehicle to update its ID, the central unit receives a similar instruction.

STEP 330: Upon receipt of an account identification code from a vehicle passing by an individual local monitor, the central unit identifies the account to be debited by searching in its memory for the account identification code. Each account identification code is preferably stored in association with an indication of the corresponding account, such as a master account identification code. For example, the central unit may have in memory a table including the current identification code of each of the multiplicity of accounts.

STEP 340: The account associated with the tag in the passing vehicle is decremented.

STEP 350: If an ID updating instruction was received in step 320, the ID index of the tag in the passing vehicle is incremented in the memory of the central unit.

STEP 360: The previous and current identification codes of the identified account are sent to all local monitors.

Figure 4:
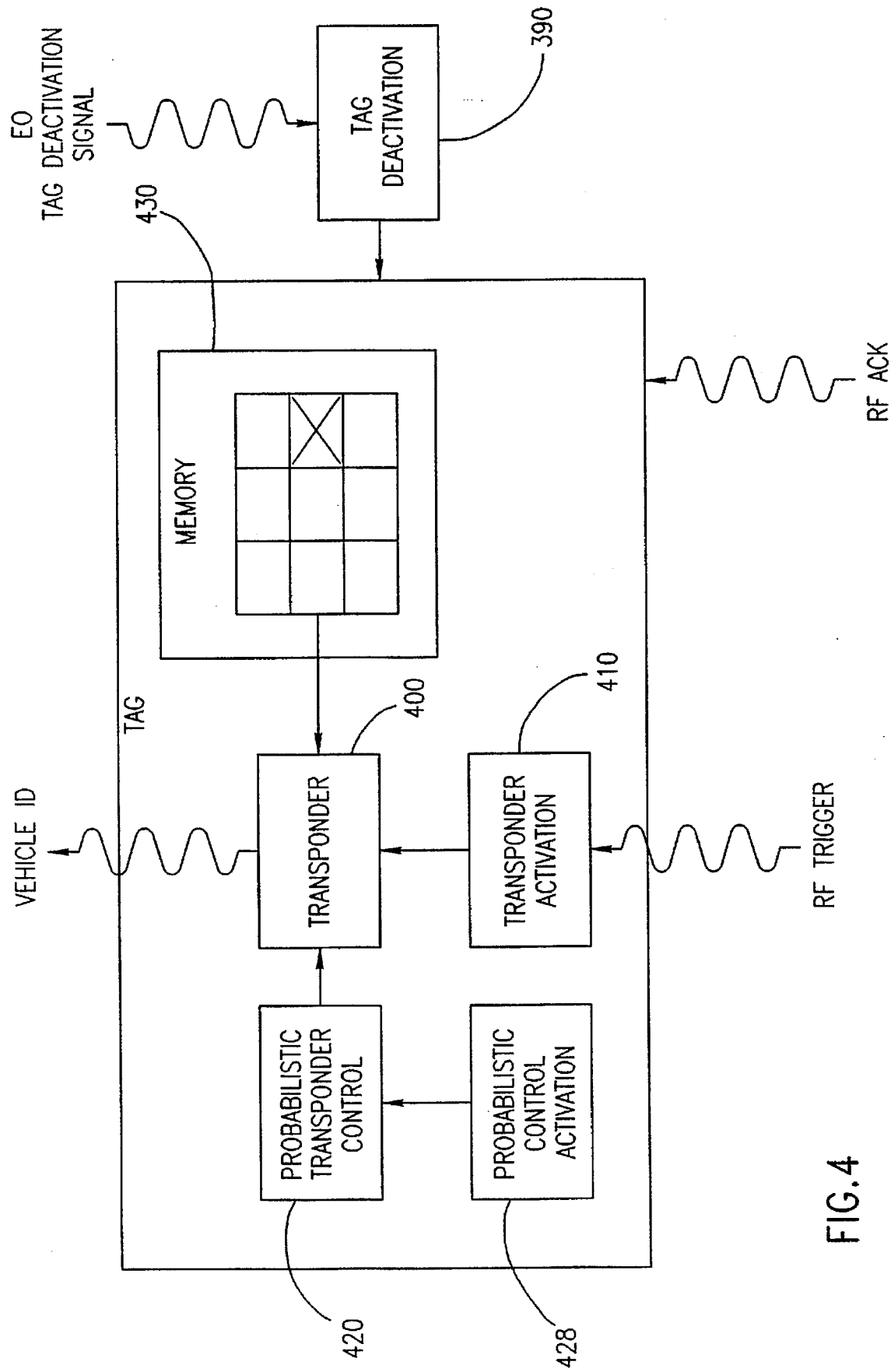
FIG. 4 is a simplified functional block diagram of a tag, associated with a vehicle, a multiplicity of which form part of a vehicle service monitoring system constructed and operative in accordance with a preferred embodiment of the present invention.

Reference is now made to FIG. 4 which is a simplified block diagram of a tag associated with a vehicle, a multiplicity of which form part of a vehicle service monitoring system constructed and operative in accordance with a preferred embodiment of the present invention.

Optionally, units 400, 410, 420, 428 and 430 may be deactivated by a tag deactivation unit 390. Tag deactivation unit 390 is operative in response to receipt of an electro-optical tag deactivation signal from the local monitor of FIG. 5, as described in detail below with reference to FIG. 5.

Figure 5:
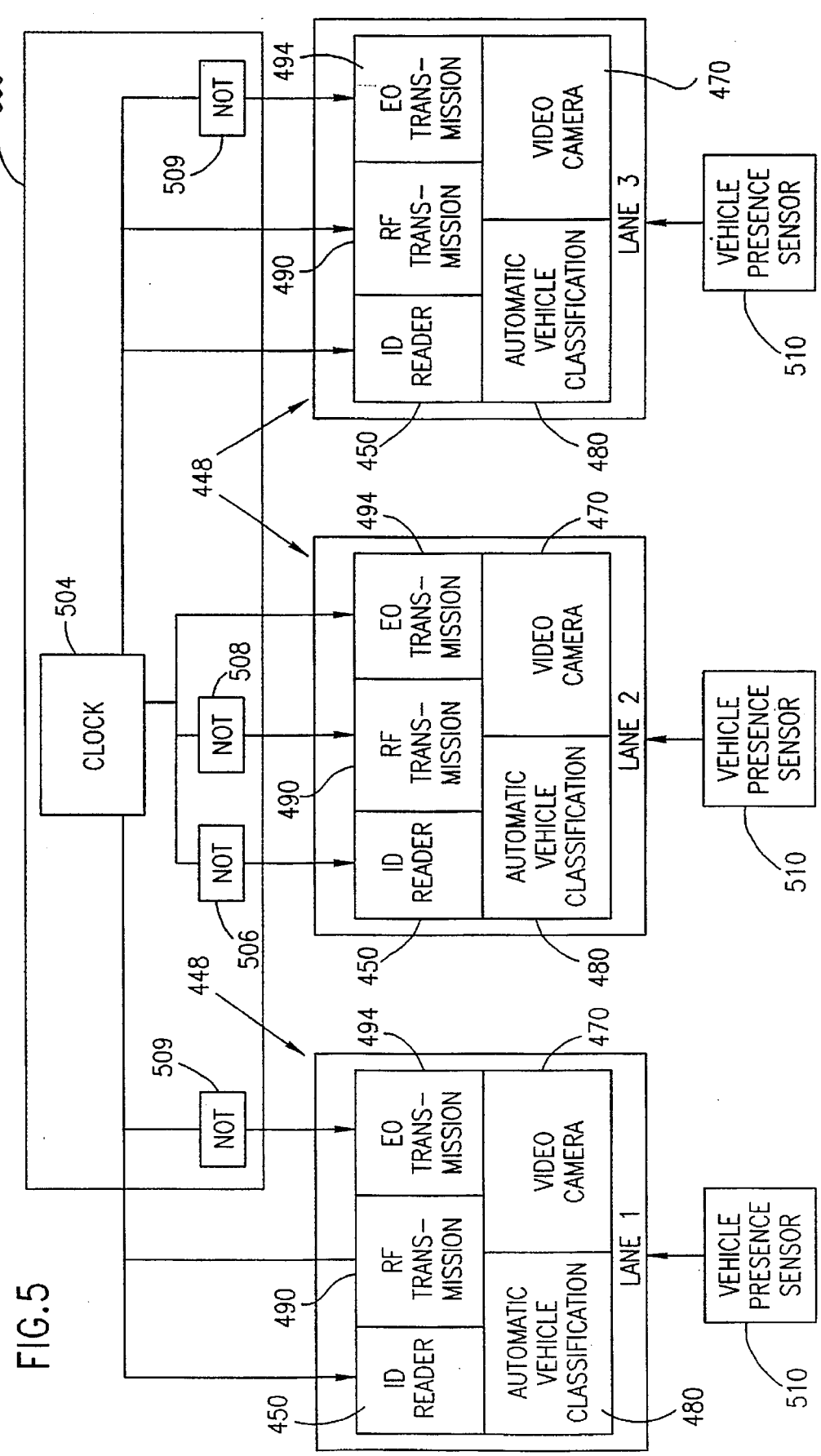
FIG. 5 is a simplified functional block diagram of a local monitor of vehicle passage which forms part of a vehicle service monitoring system constructed and operative in accordance with a preferred embodiment of the present invention.

The tag of FIG. 4 preferably includes the following components:

a. a transponder 400, operative to transmit a current account identification code;

b. a transponder activator 410, operative in response to an RF trigger received from the local monitor of FIG. 5 to cause transponder 400 to revert from a standby mode into an alert mode;

c. a probabilistic transponder control unit 420, such as a RANDOMIZE function or other random number generator, which is operative to cause the transponder to send the current ID code on a probabilistic basis. As described above, optionally, different probabilities of transmission may be employed at different times, typically in accordance with a predetermined schedule.

d. a probabilistic control activation unit 428 if it is desired to activate probabilistic transponder control unit 420 only some of the time, such as only after a predetermined number of polling requests have been received; and e. a memory 430, such as a ROM, in which a table of account identification codes is stored, one of which is indicated in the drawing by an "x" to be the currently valid code. It is appreciated that the location of the "x" preferably varies each time a code is transmitted. The currently valid code may in practice be indicated by any suitable means, such as by means of a pointer.

For simplicity, the table is shown to include only 9 different codes. More typically, the table may include a larger number of codes, such as 500 randomly selected codes from among the approximately 4 billion possible 32-bit codes.

Reference is now made to FIG. 5 which is a simplified block diagram of a local monitor of vehicle passage which forms part of a vehicle service monitoring system constructed and operative in accordance with a preferred embodiment of the present invention.

The local vehicle passage monitor of FIG. 5 preferably includes one lane monitor 448 per lane. Each lane monitor 448 preferably includes the following elements:

a. an ID reader 450 which is operative to read an account identification code transmitted by the tag of a passing vehicle;

b. optionally, a video camera 470; and c. optionally, an automatic vehicle classification unit 480 which is operative to identify the type of vehicle which is passing, for example, by counting the number of axles of the vehicle.

d. a radio frequency (RF) transmission unit 490 operative to transmit messages to tags in passing vehicles, such as triggers, polling messages and acknowledgement messages. A preferred implementation of RF transmission unit 490 is described below with reference to FIG. 7.

e. an electro-optic (EO) transmission unit 494 operative to transmit electro-optic transmissions to tags in passing vehicles, such as tag deactivation signals. A preferred implementation of EO transmission unit 494 is described below with reference to FIG. 8.

The operation of EO transmission unit 494 in conjunction with tag deactivation unit 390 of FIG. 4 provides TDMA (time domain multiple access) between tags passing local monitors in adjacent or nearly adjacent lanes in that tags in adjacent or nearly adjacent lanes are not simultaneously operative, but rather each operate in an individual time slot. In other words, time division between tags is preferably provided.

For simplicity, the apparatus of FIG. 5 is shown to include three lane monitors 448 so that the apparatus is suitable for monitoring three lanes. However, it is appreciated that the apparatus of FIG. 5 may be expanded so as to monitor any number of lanes by providing a lane monitor 448 for each lane in the road.

The apparatus of FIG. 5 also preferably includes a clock system 500 which is operative to provide synchronous TDMA (time domain multiple access) between the tags passing lane monitors 448 and between the lane monitors 448 themselves, and particularly units 450 and 490 thereof. Time division between the lane monitors is provided by synchronizing vehicle monitoring in a plurality of lanes such that, preferably, adjacent lane monitors 448, and particularly units 450 and 490 thereof, are not simultaneously operative. For example, the clock system 500 may include a clock 504 generating a clock signal having a period of length T which includes alternating ON portions of length T/2 and OFF portions of length T/2.

In the illustrated embodiment, units 450 and 490 of lanes 1 and 3 are operative when the same units in lane 2 are not operative, and vice versa, as shown conceptually by NOT gates 506 and 508. It is appreciated that, more generally, the lanes may be divided into three groups instead of two groups, such that, for example, for an 8-lane road, ID reading and RF transmission in lanes 1, 4 and 7 alternates with ID reading and RF transmission in lanes 2, 5 and 8 and with ID reading and RF transmission of lanes 3 and 6 such that all lanes are monitored equally frequently but not simultaneously with any adjacent or nearly adjacent lane. Similarly, the lanes may be divided into four or more groups.

Time division between tags is provided by EO transmission units 494. As shown conceptually by provision of a NOT gate 509 in association with the EO transmission units of the odd lanes, tags in the odd lanes are deactivated, typically continuously, during the time in which the ID readers and RF transmission units of the odd lanes are inactive, at which time the ID readers and RF transmission units of the even lanes are active. Similarly, tags in the even lanes are deactivated, typically continuously, during the time in which the ID readers and RF transmission units of the even lanes are inactive, at which time the ID readers and RF transmission units of the odd lanes are active.

A vehicle presence sensor 510 is preferably provided for each lane which senses an approaching vehicle and activates the corresponding lane monitor 448.

Reference is now made to FIG. 6 which is a simplified block diagram of a central control unit of a vehicle service monitoring system constructed and operative in accordance with a preferred embodiment of the present invention.

The apparatus of FIG. 6 preferably includes the following elements:

a. A communication unit 512 for communicating with local vehicle passage monitors using conventional inter-computer communication links such as fiber optic links;

b. A memory 520 in which information is stored regarding each of a multiplicity of tags, each tag corresponding to an individual account. For simplicity, the memory 520 is shown storing information for each of 25 accounts. However, it is appreciated that, typically, many more tags are distributed, such as up to millions of tags. Similarly, for simplicity, each tag is shown to have available only 9 alternative codes, although more typically, each tag has access to a larger number of codes, such as 500 randomly selected 32-bit codes.

The memory 520 typically includes the following information regarding each of the 25 illustrated tags, each tag corresponding to an individual account:

i. a list of alternative account identification codes;

ii. an indication of a currently valid one of the codes in the list. In FIG. 5, the currently valid code for each tag is indicated by an "x". In practice, the currently valid code is indicated by any suitable means such as by means of a pointer.

iii. Other information regarding the tag, such as a serial number or other master identification code for the tag, the balance remaining in the account corresponding to the tag, and the bank credit card number to be debited when the balance dips below a predetermined minimum balance, such as $10.00.

Figure 7:
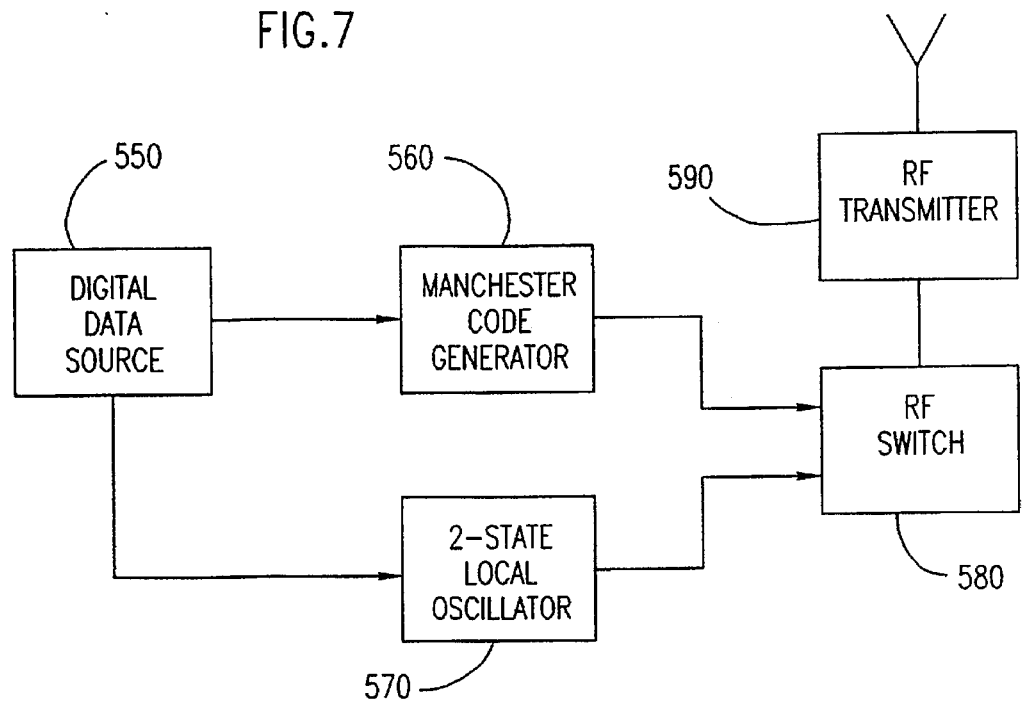
FIG. 7 is a simplified functional block diagram illustration of an RF transmission unit forming part of the apparatus of FIG. 6, which is constructed and operative in accordance with a preferred embodiment of the present invention.

Reference is now made to FIG. 7 which is a simplified block diagram illustration of RF transmission unit 490 of FIG. 5, constructed and operative in accordance with a preferred embodiment of the present invention.

The RF transmission unit 490 includes a digital data source 550 which generates or receives from an external source, digital data for transmission to a vehicle tag such as triggers, polling messages, and acknowledgements. Digital data source 550 may, for example, comprise a microprocessor. A Manchester code generator 560 receives the digital data stream provided by digital data source 550 and converts the data stream into Manchester coded form.

A two-state local oscillator 570 generates an RF carrier signal which is in a first state when a bit received by the oscillator from digital data source 550 is "1" and in a second state, whose phase is shifted 180 degrees relative to the phase of the first state, when the bit received by the oscillator from digital data source 550 is "0".

The carrier signal generated by oscillator 570 and the Manchester coded data are received by a modulator 580, such as an RF switch. RF switch 580 is operative to transform the Manchester coded signal into an ASK Manchester coded signal which is preferably suitable for reception by a unipolar ASK Manchester coded vehicle toll tag, by multiplying the Manchester coded signal by the RF carrier signal. The ASK Manchester coded signal may be transmitted to a vehicle toll tag by means of an RF transmitter 590.

Figure 8:
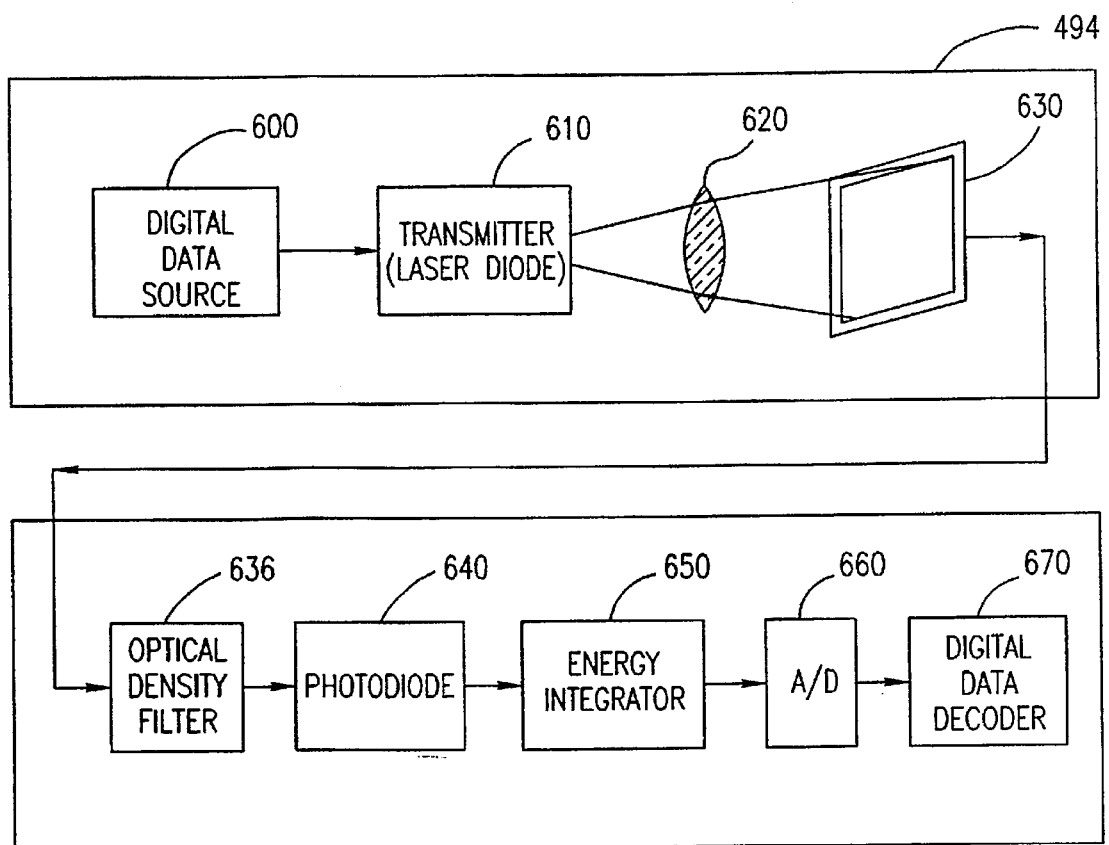
FIG. 8 is a simplified functional block diagram illustration of an electro-optical transmission unit forming part of the apparatus of FIG. 5 and of a tag deactivation unit forming part of the apparatus of FIG. 4, both of which are constructed and operative in accordance with a preferred embodiment of the present invention.

Reference is now made to FIG. 8 which is a simplified block diagram illustration of electro-optical transmission unit 494 of FIG. 5 and of tag deactivation unit 390 of FIG. 4, both constructed and operative in accordance with a preferred embodiment of the present invention.

The EO transmission unit 494 typically includes a digital data source 600 which generates or receives, from an external source, digital data for transmission to a vehicle tag such as triggers, deactivation signals, polling messages, and acknowledgements. Digital data source 600 may, for example, comprise a microprocessor. The digital data provided by digital data source 600 is provided to an optical transmitter including a LED or a laser diode 610, a lens 620 and an optical beam aperture 630. Preferably, the dimensions and/or shape of the window defined by the aperture, and/or the position of the window relative to the laser diode 610 and lens 620 are field-selectable to accommodate lanes of different widths, shapes and orientations. For example, the arrangement of the aperture 630 relative to the lens 620 may be field-selectable.

The shape of the aperture 630 is shown, for simplicity, to be rectangular. However, a rectangular aperture typically results in a nonrectangular projection of the beam on the lane, which is normally undesirable. Therefore, it is believed that the optimal shape for the aperture is not rectangular but rather a shape such as a trapezoid which takes into account the eventual shape of the beam impinging on the lane.

It is appreciated that EO transmission unit 494 may be employed to provide any type of EO messages to the tags within passing vehicles or to the central control unit of FIG. 6, including but not limited to provision of electro-optical tag deactivation signals to tags within passing vehicles.

As described above with reference to FIG. 4, the tag deactivation unit 390 is operative to receive electro-optical communications from the EO transmission unit 494 of the local monitor, such as an electro-optical tag deactivation signal. Tag deactivation unit 390 typically includes an optical density filter 636, a wide angle optical receiver 640 such as a photodiode, an energy integrator 650, an analog-to-digital unit 660, such as a comparator with an adaptive threshold, and a digital data decoder 670.

A particular advantage of the present invention is provision of nonsimultaneous operation of tags arriving at adjacent or nearly adjacent lanes and nonsimultaneous operation of the corresponding lane monitors which is synchronized to the nonsimultaneous operation of the tags.

The term "tag" is used in the present specification and drawings very broadly to refer to any type of device which has the general functionality of FIGS. 1 and 4 and is configured for association with a vehicle. A tag may have any suitable configuration such as but not limited to a generally rectangular configuration and may be associated with a vehicle in any suitable manner such as by attachment to the windshield, to the license plate or to any other portion of a vehicle. Alternatively, the tag may be entirely portable such that the driver of a vehicle may carry the tag with him upon exiting the vehicle.

Figure 9:
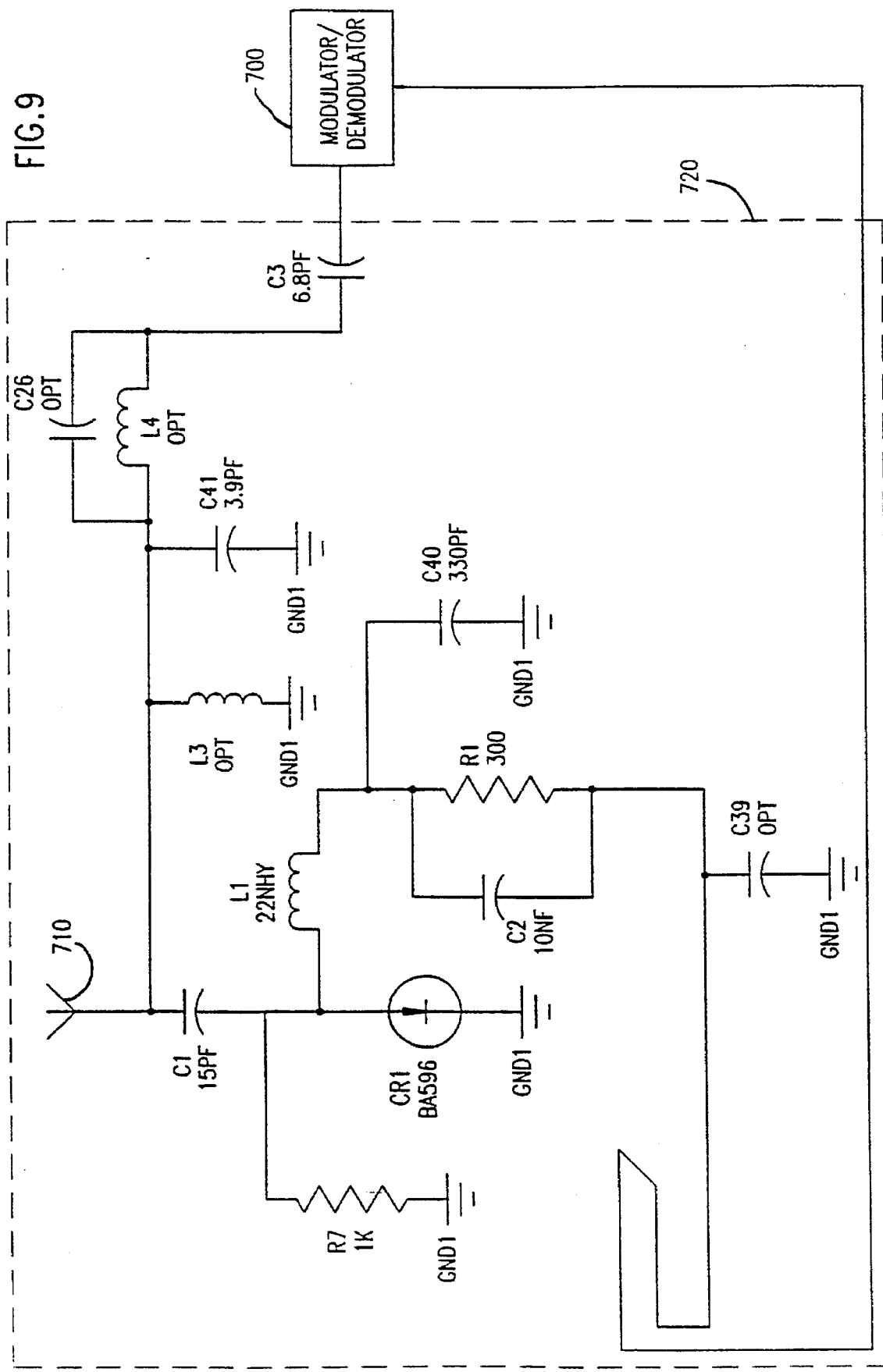
FIG. 9 is a schematic block diagram of a backscattering transponder constructed and operative in accordance with a preferred embodiment of the present invention.

Reference is now made to FIG. 9 which is a schematic block diagram of a backscattering transponder constructed and operative in accordance with a preferred embodiment of the present invention. The transponder of FIG. 9 includes a modulator/demodulator 700, an antenna 710 which is operative to transmit modulated data generated by the modulator/demodulator 700 and antenna switching apparatus 720. A suitable modulator/demodulator 700 is described in section 2.2 of *Receiving systems Design*, Stephen J. Erst. ARTECH HOUSE INC., 1984. The antenna 710 may, for example, comprise a corner reflector antenna, commercially available from DAPA P.O. Box 190, Allegany, N.Y. 14706 U.S.A., (Series 1850.001-1851.001-1852.001). Typically, the antenna as well as the modulator/demodulator are implemented on a single PCB (printed circuit board).

The antenna switching apparatus 720 switches the antenna 710 between the modulator/demodulator 700 and the ground such that when the antenna is in receiving mode, the antenna is connected to the modulator/demodulator and 700 and such that, when the antenna is in transmitting mode, the antenna 710 is switched between the modulator/demodulator and the ground according to the modulated data. For example, the antenna 710 may be switched to the modulator/demodulator when the logic state of the modulated data is "1". When the logic state of the modulated data is "0", the antenna 710 is switched to the ground.

It is appreciated that the particular backscattering apparatus shown and described above has broad applications and is not limited to vehicle-mounted transponders.

Reference is now made briefly back to FIG. 2. It is appreciated that, alternatively, the local monitor of vehicle passage may be replaced by a vehicle information writing station, which is typically positioned at the entrance to a vehicle facility and a vehicle information reading station, which is typically positioned at the exit from a vehicle facility.

Figure 10:
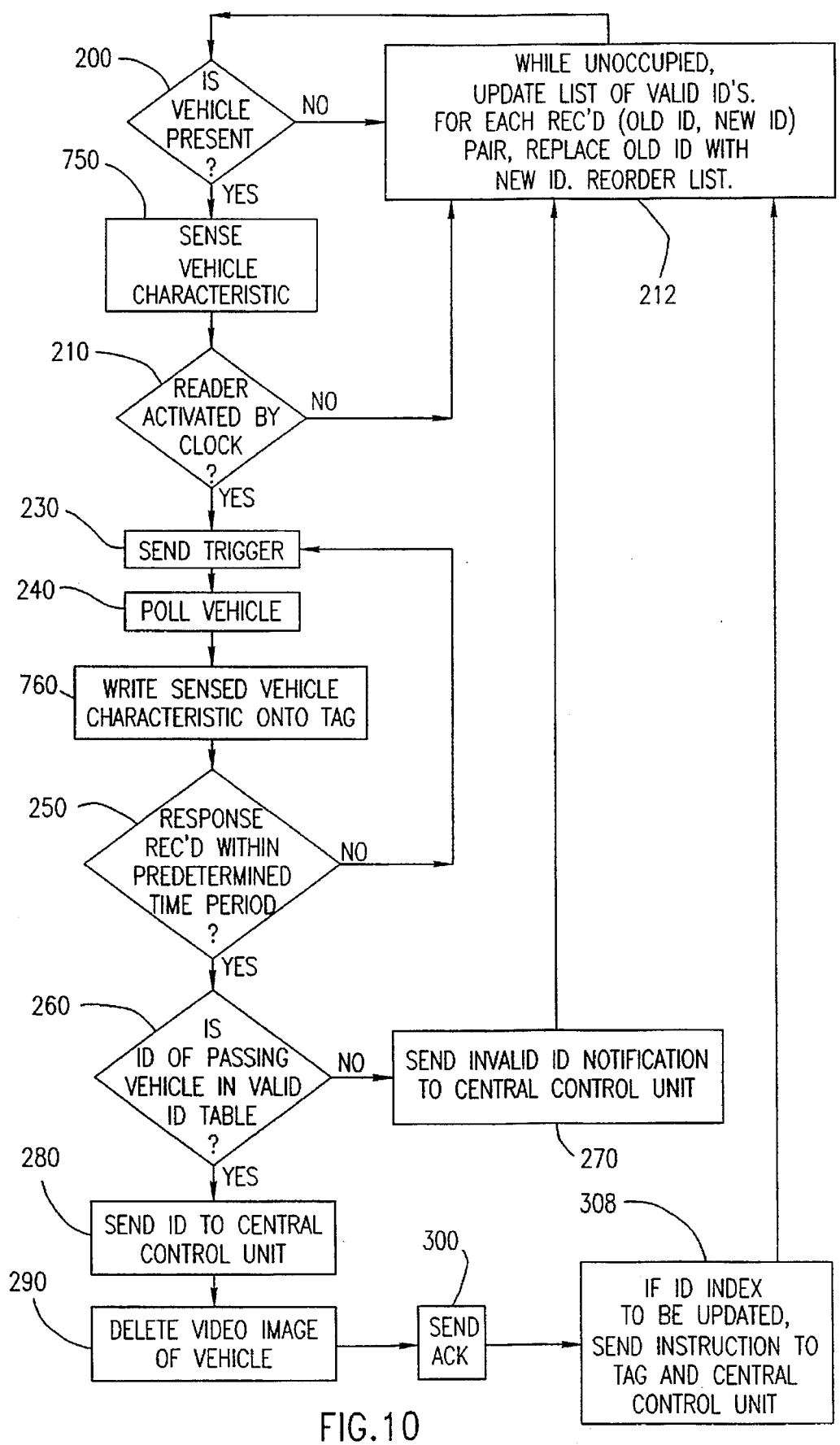
FIG. 10 is a simplified flowchart of a method similar to the method of FIG. 2 except that step 208 is replaced or augmented by step 750, and step 240 is followed by a new step 760 in which the sensed vehicle characteristic is written onto the tag.
Figure 11:
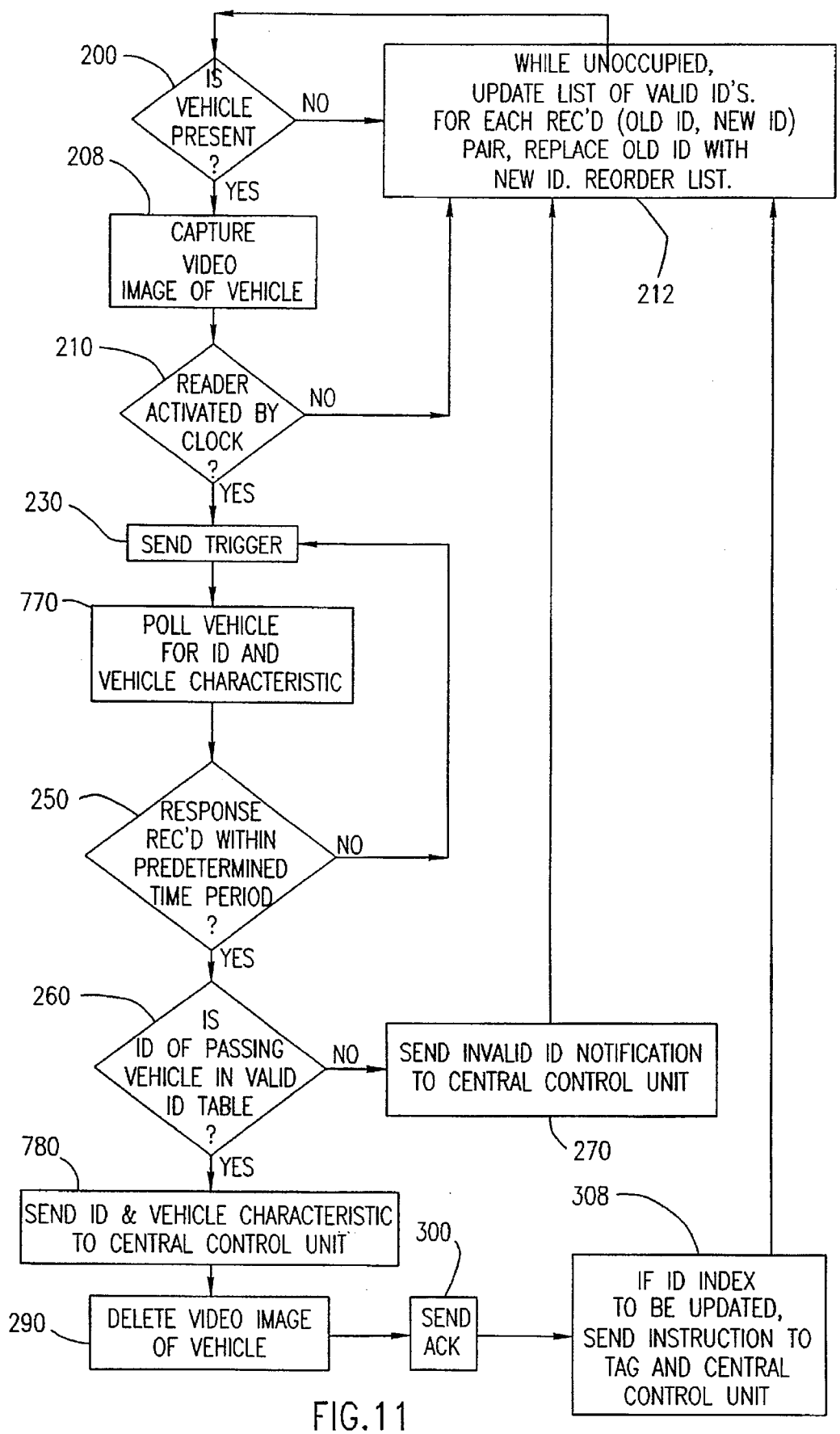
FIG. 11 is a simplified flowchart of a method similar to the method of FIG. 2 except that step 240 is replaced by step 770, and step 280 is replaced by step 780 in which the vehicle characteristic, as well as the tag's ID is sent to the central control unit.

Reference is now made to FIGS. 10 and 11 which are simplified flowcharts of preferred methods carried out by a vehicle information writing station and vehicle information reading station, respectively.

FIG. 10 is similar to FIG. 2 except that step 208 is replaced or augmented by step 750 in which at least one characteristic of the vehicle, such as the type of vehicle and/or weight or size or height of vehicle and/or the number of axles thereon, is sensed.

Also, step 240 is followed by a new step 760 in which the sensed vehicle characteristic is written onto the tag.

FIG. 11 is similar to FIG. 2 except that step 240 is replaced by step 770 in which the tag is polled for the vehicle characteristic as well as for the tag's ID. Also, step 280 is replaced by step 780 in which the vehicle characteristic, as well as the tag's ID is sent to the central control unit.

Figure 12:
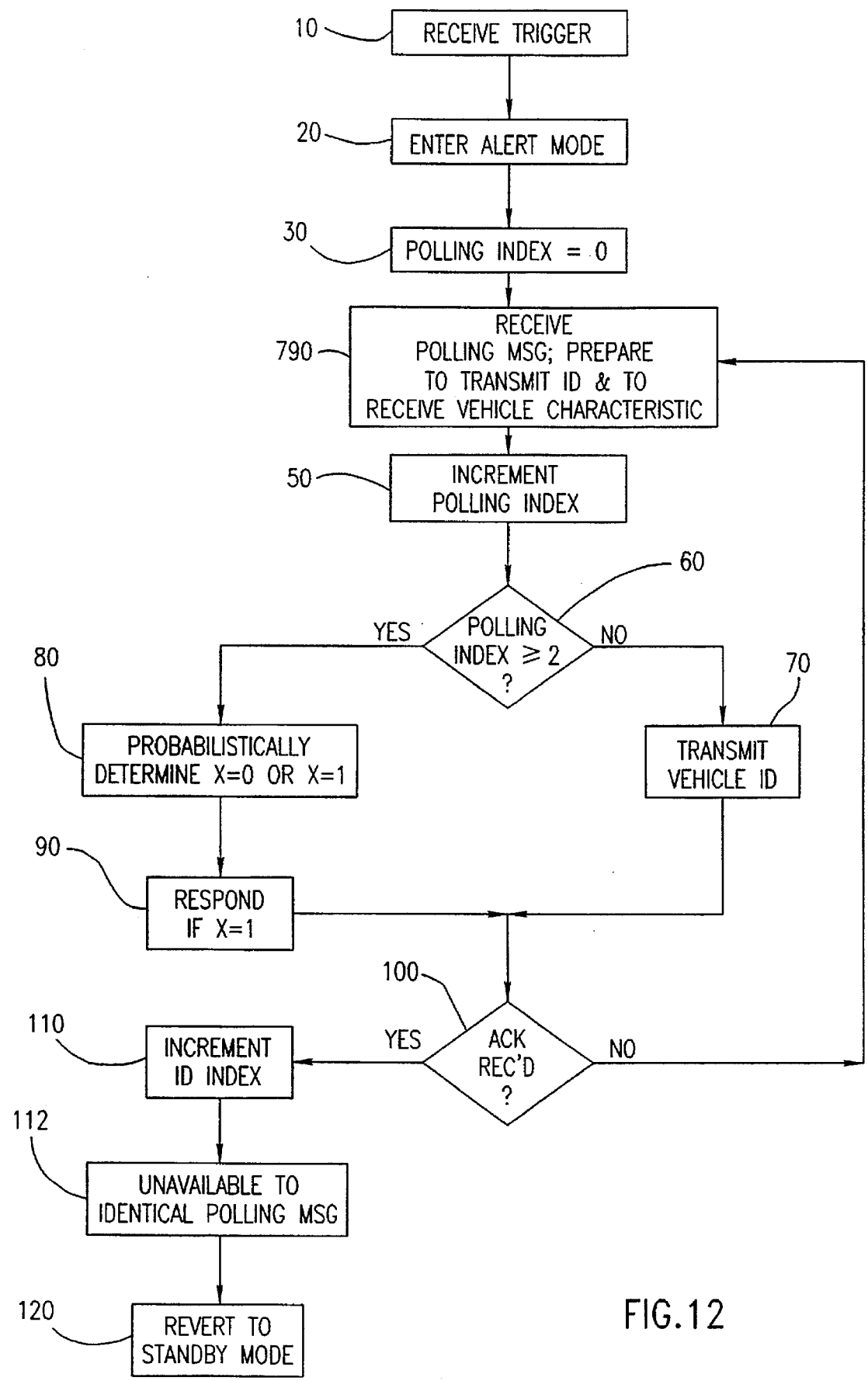
FIG. 12 is a simplified flowchart of a method carried out by the tag associated with the vehicle upon interaction with the vehicle information writing station of FIG. 10.
Figure 13:
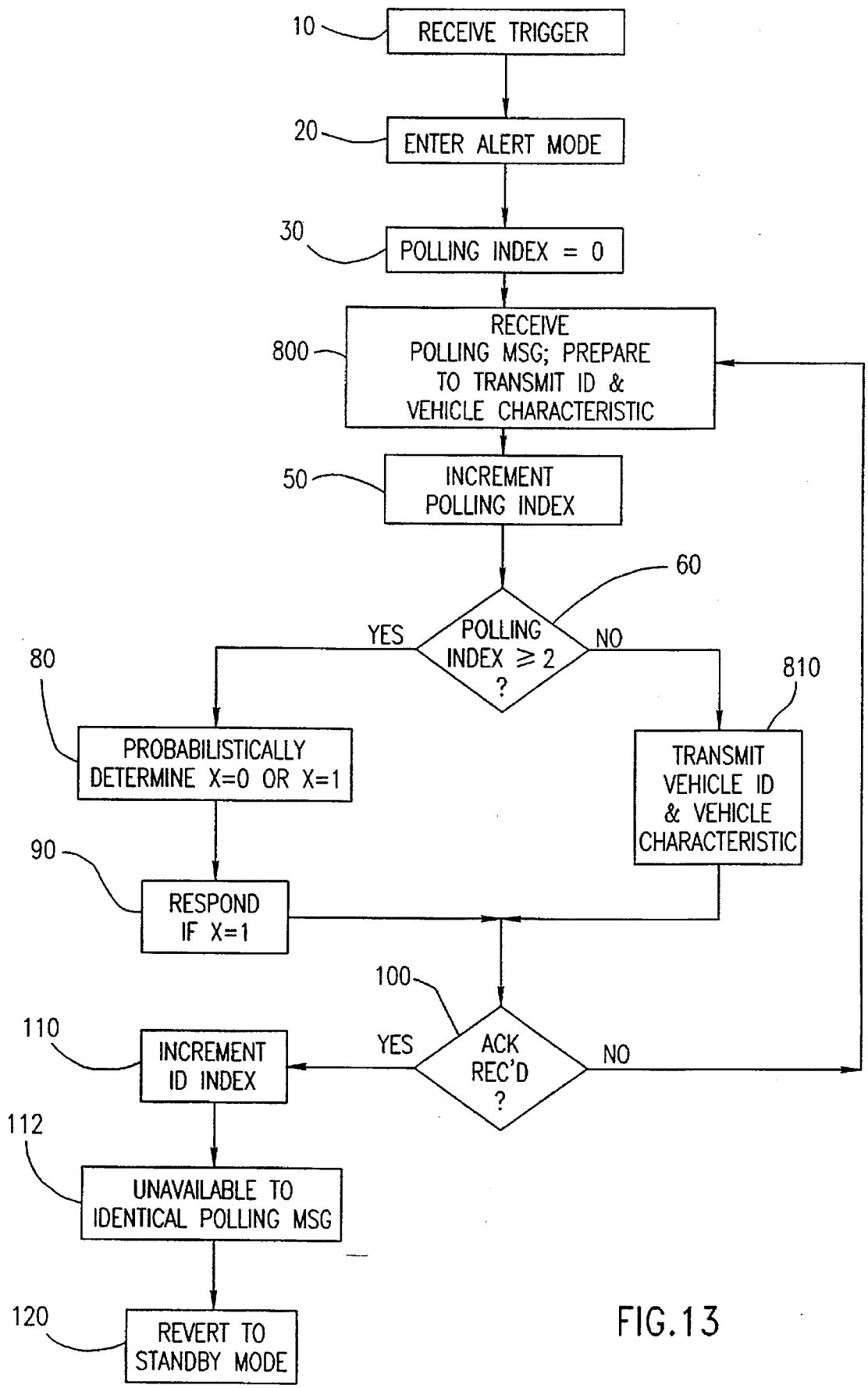
FIG. 13 is a simplified flowchart of a method carried out by the tag associated with the vehicle upon interaction with the vehicle information reading station of FIG. 11.

FIGS. 12 and 13 are simplified flowcharts of methods carried out by the tag associated with the vehicle upon interaction with the vehicle information writing station of FIG. 10 and with the vehicle information reading station of FIG. 11, respectively.

FIG. 12 is similar to FIG. 1 except that step 40 is replaced by step 790 in which a polling message, requesting the tag's ID and alerting for receipt of the vehicle characteristic, is received. The tag then prepares to transmit the ID and to receive for storage the vehicle characteristic from the vehicle information writing station of FIG. 10.

FIG. 13 is similar to FIG. 1 except that step 40 is replaced by step 800 in which a polling message, requesting the vehicle characteristic as well as the tag's ID is received. The tag then prepares to send this information. In step 810, which replaces step 70 of FIG. 1, this information is sent.

It is appreciated that, in the illustrated embodiment, a characteristic of the vehicle is sensed by the vehicle information writing station of FIG. 10, is written onto the tag, and is subsequently read off the tag by the vehicle information reading station of FIG. 11.

A preferred modified ASK modulation scheme is now described, which is useful for automatic fee collection in toll roads using a unipolar ASK, Manchester coded. The spectrum of the ASK modulation scheme, described herein, when compared to the spectrum of a conventional ASK scheme, shows a 4 dB improvement from the field disturbance point of view, which means less interference with other electronic equipment operating at the same frequency band.

One of the problems in automatic fee collection in toll roads, is solving two contradicting requirements. The first one is a requirement to activate a tag in the car only if the field strength near the car (at a distance of approximately 7 meters), is above a threshold of 500[mvolt/meter]. The second requirement is not allowing the average field strength to exceed the above mentioned threshold at a distance of 3 meters, because of field disturbance which interferes with other electronic equipment operating at the same frequency band.

Figure 14:
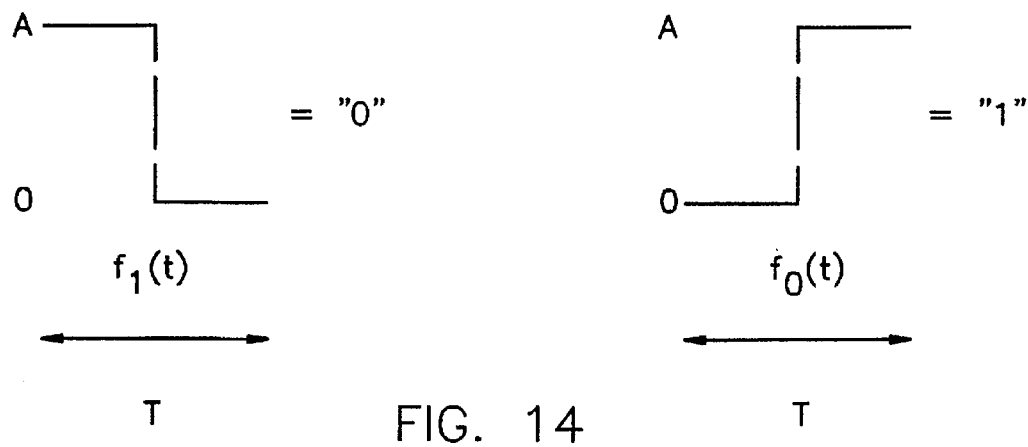
FIG. 14 is a simplified diagram of baseband waveforms of a Manchester coded unipolar ASK.

The automatic fee collection system shown and described herein uses a unipolar ASK (Manchester coded). The field disturbance strength is measured in a bandwidth of 100 Khz, which is much narrower than the spectrum of a stream of a random sequence of binary bits ("0" and "1"), whose length is T, modulating the above mentioned ASK. Baseband waveforms of a UNIPOLAR ASK (Manchester coded) are shown in FIG. 14.

The transmitted RF signal is achieved by multiplying this baseband signal by a cosine function of the carrier frequency. This signal can be represented in mathematical form as a sequence of two possible waveforms: S1(t) or S0(t) where:

$$S1(t) = f1(t) * \cos(W0*t) \quad -T < t < +T \qquad (1)$$

$$S0(t) = f0(t) * \cos(W0*t) \quad -T < t < +T \qquad (2)$$

Figure 15:
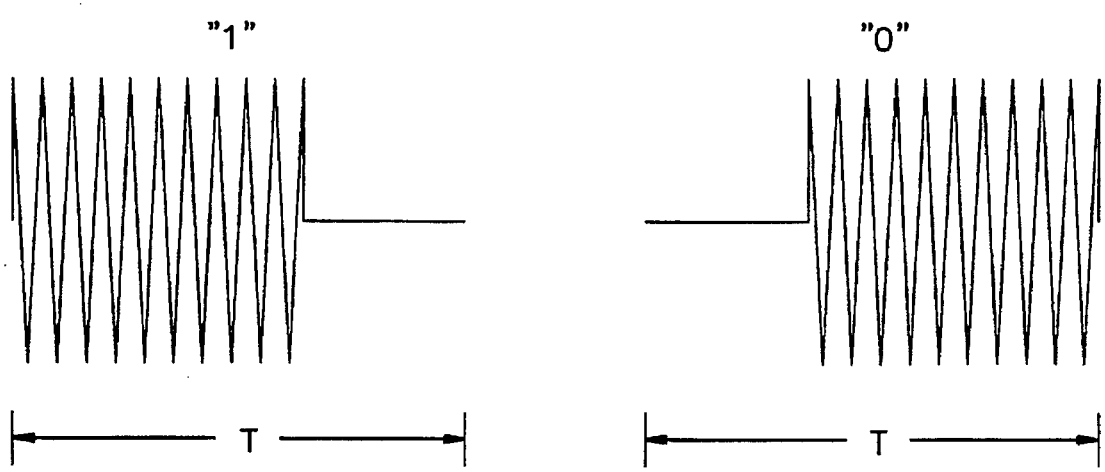
FIG. 15 is a simplified diagram of RF waveforms of a conventional Manchester coded ASK.

In Equations 1 and 2 W0 is $2\pi f0$ and f0 is the carrier frequency. These RF waveforms are shown in FIG. 15.

Figure 16:
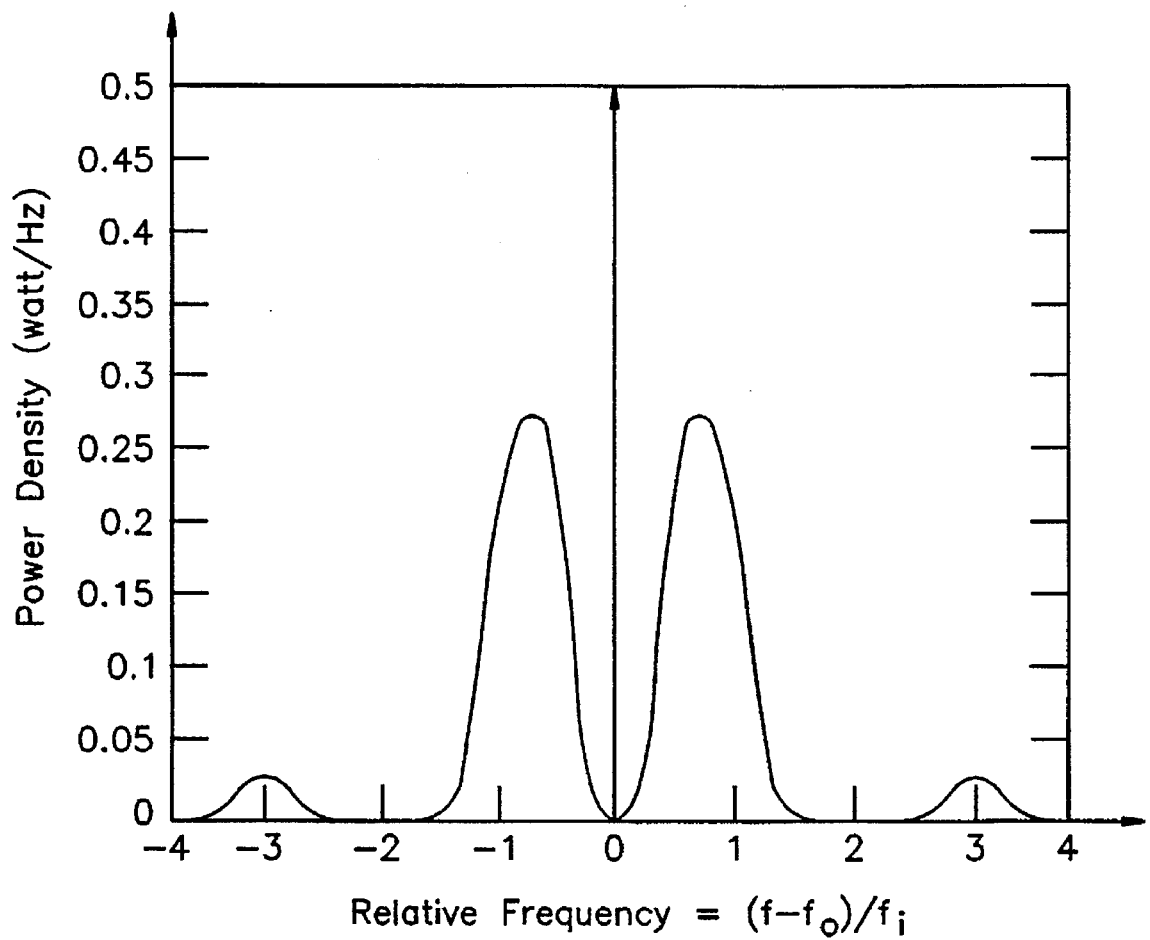
FIG. 16 is a graph illustrating the spectrum of a conventional Manchester coded ASK.

The spectrum of this RF signal is shown in FIG. 16. Each bit time length is T, and the information rate fi is defined as 1/T. As shown, fifty percent of the signal's spectrum lies in the carrier itself. As such, even a very narrow bandwidth detector, centered around the carrier frequency, will accumulate 50% of its power which results in considerable interference to other electronic equipment operating at the same frequency band.

In FIG. 16, $$\text{SPECTRUM}(x)=\tfrac{1}{2}\delta(x)+\tfrac{2}{\pi}[(\sin \pi x/2:\pi x/2)^2-\sin(\pi x/2):\pi x/2*\sin(3\pi x/2):3\pi x/2]$$

where x=(f–f0)/fi.

It is preferable to avoid a concentration of a lot of power in any frequency. The modified ASK system described herein is similar to the above-described method. The baseband waveform of this method may be the one described above with reference to FIG. 16. However, the method of creating the RF signal is by multiplying the waveform described in FIG. 14 differently, for the two cases of a "1" and "0" bits respectively. While for a "1" the waveform multiplied by a cosine function of the carrier frequency, for "0" the waveform is multiplied by a cosine function of the carrier frequency shifted by 180 degrees. The new signal can be represented in mathematical form as a sequence of two possible waveforms: S1(t) or S0(t) where:

$$S1(t) = f1(t) * \cos(W0*t) \quad -T < t < +T \qquad (3)$$

$$S0(t) = f0(t) * \cos(W0*t + 180) \quad -T < t < +T \qquad (4)$$

Figure 17:
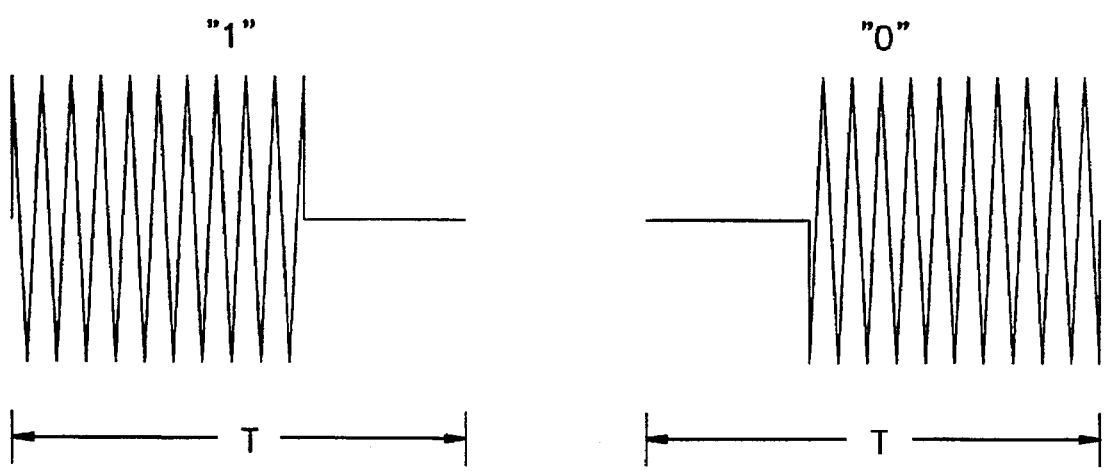
FIG. 17 is a simplified diagram of RF waveforms of a modified Manchester coded ASK.

These RF waveforms are shown in FIG. 17.

Figure 18:
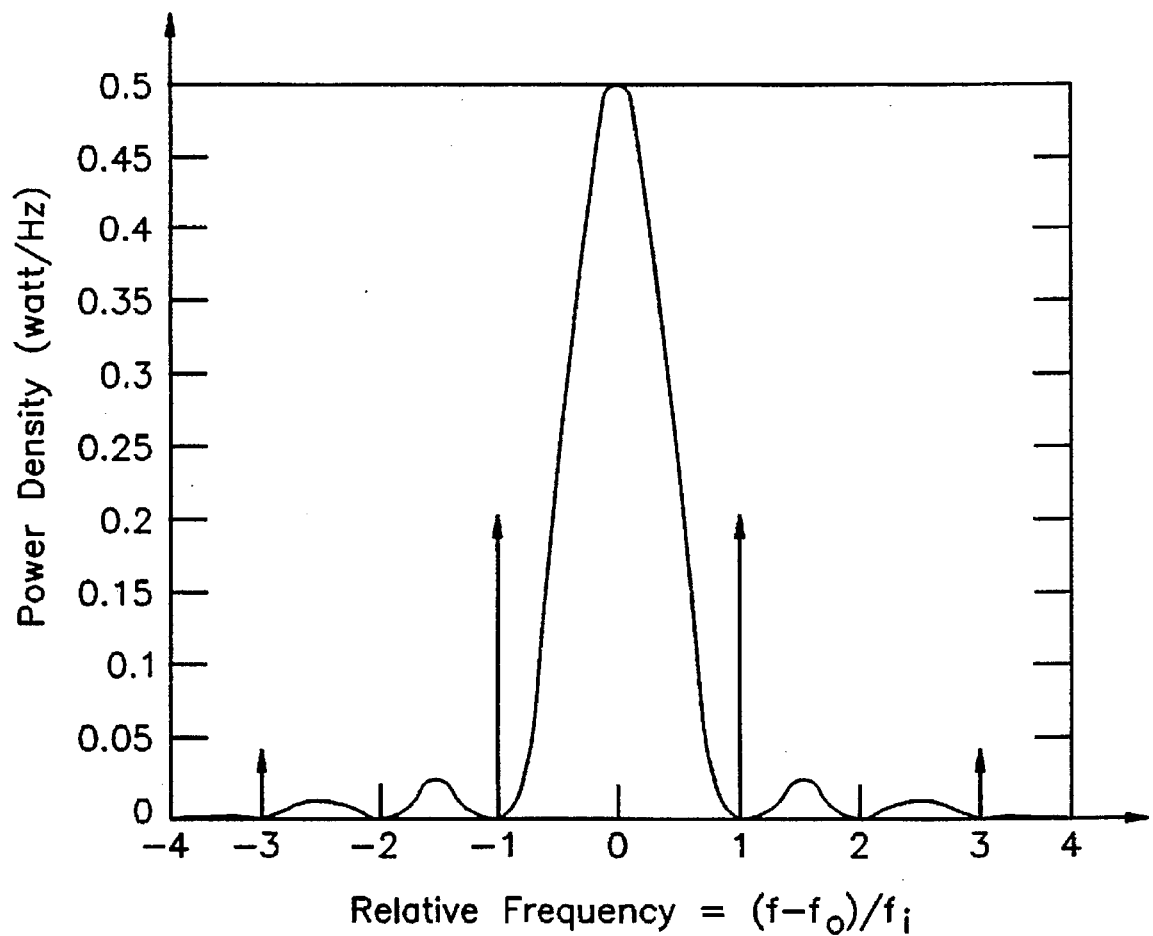
FIG. 18 is a graph illustrating the spectrum of a modified ASK.

The spectrum of this RF signal is shown in FIG. 18 and is much more spread than the spectrum described above. It does not have a lot of power concentrated around any frequency (including the carrier), and as such, causes much less interference to other electronic equipment. The spectrum emitted by a reader is easily detected, even by tags which are built for a conventional ASK, since the envelope of the signal remains the same.

In FIG. 18, $$\text{SPECTRUM}(x)=0.25[(\sin \pi x/\pi x)^2+\Sigma[2 \sin (2k+1)\pi/2\pi(2k+1)]^2\delta[x-(2k+1))$$

where $\Sigma$ is from $\infty$ to $k=-\infty$; and x=(f–f0)/fi

The two modulation methods described above are now compared on a basis of how much power is accumulated by a detector whose bandwidth is 100 Khz.

Figure 19:
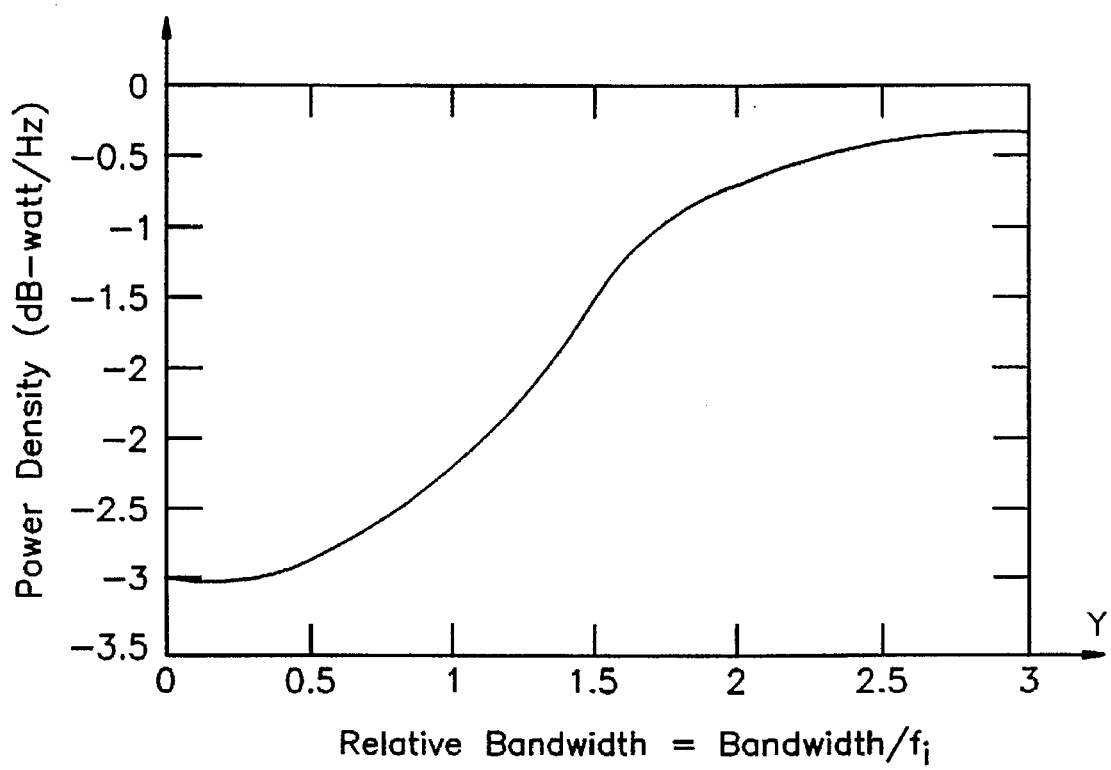
FIG. 19 is a graph illustrating the relationship between power accumulation and relative bandwidth around the carrier frequency for the conventional ASK.

From FIG. 16 it is clear that 50% of the signal's power in the in conventional ASK lies the carrier frequency, and so a 100 Khz bandwidth detector will collect 50.4% (–2.98 dB) of the total signal power. FIG. 19 shows the power accumulation vs. relative bandwidth, around the carrier frequency for the conventional ASK, by a 100 Khz bandwidth detector. The relative bandwidth y is defined as bandwidth divided by the information rate fi.

Figure 20:
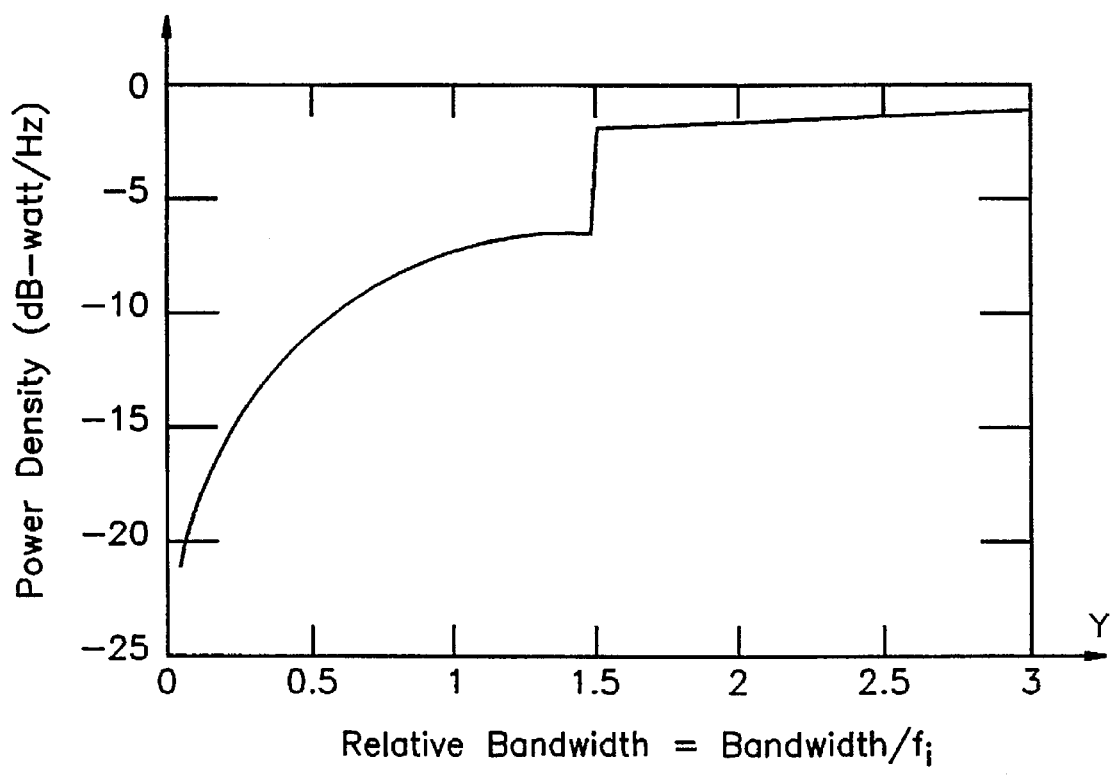
FIG. 20 is a graph illustrating the relationship between power accumulation and relative bandwidth around the main lobe center frequency for the conventional ASK.

FIG. 20 shows the power accumulation vs. relative bandwidth, around the center frequency of each one of the main lobes of this signal. The relative center frequency of each one of these lobes is 0.75 which means a shift of 0.75*fi from the carrier frequency. Each one of these lobes has 21% of the total power. If this detector is centered around the center of the main lobe it collects 8.35% (–10.78 dB) of the total power which is negligible, compared to the power collected around the carrier.

Figure 21:
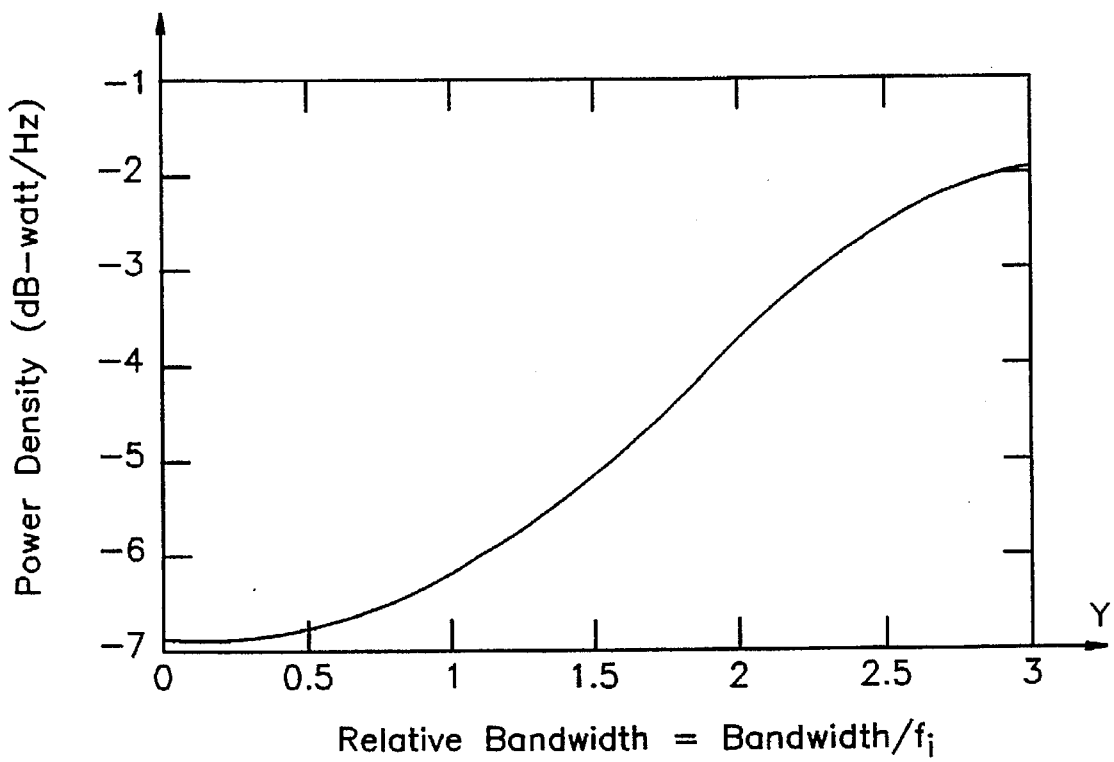
FIG. 21 is a graph illustrating the relationship between power accumulation and relative bandwidth around the center frequency of the main lobe for the modified ASK.

From FIG. 18 it is clear that 20.3% of the signal's power in the modified ASK lies in each one of the frequencies: (f0+fi) and (f0–fi). A 100 Khz detector centered around each one of these frequencies will collect 20.4% which is –6.9 dB of the total signal power. FIG. 21 shows the result of a 100 Khz bandwidth detector collecting the power of the main lobe of this signal. This lobe contains 40% of the total power. If a 100 Khz detector is centered around the carrier it collects 16% which is –8 dB of the total power.

Figure 22:
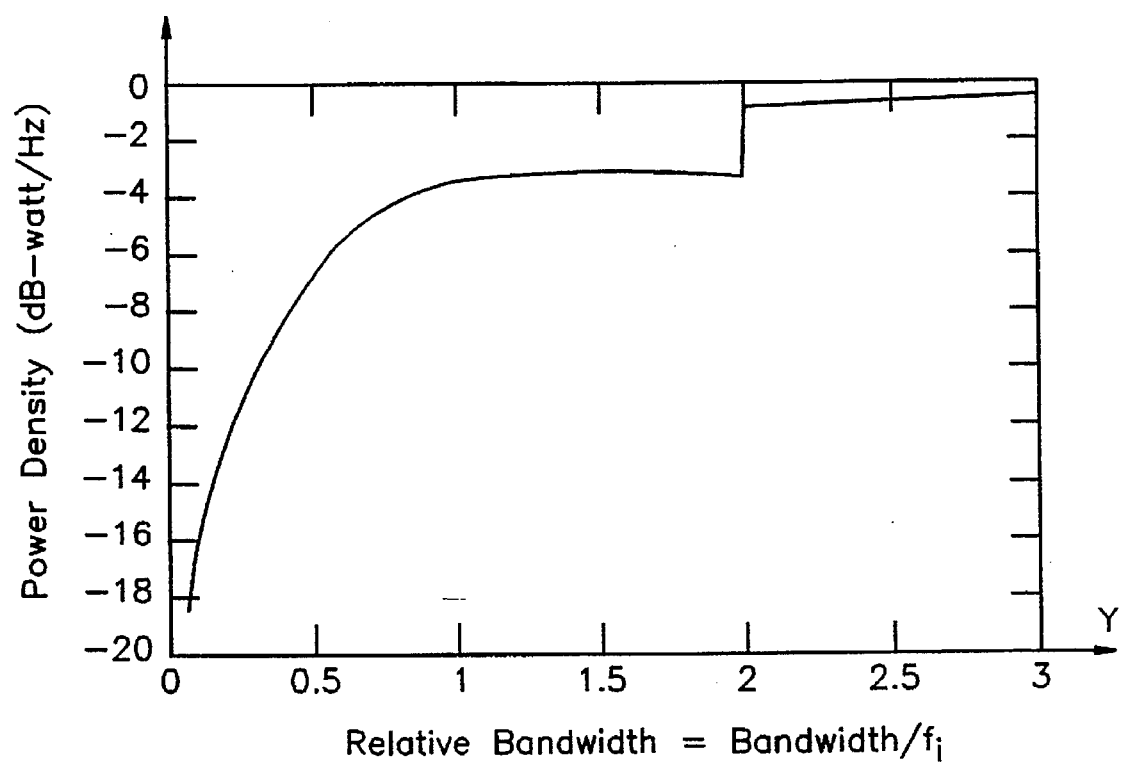
FIG. 22 is a graph illustrating the relationship between power accumulation and relative bandwidth around the carrier frequency for the modified ASK.

FIG. 22 shows the power accumulation vs. relative bandwidth, around the carrier frequency for the modified ASK, by a 100 Khz bandwidth.

Therefore, the modified ASK is more spread than the conventional ASK in both regions. For the worst case, which is the frequency where the power is most concentrated:

For the conventional ASK this frequency occurs around the carrier where 50.4% (–2.98 dB) of the power is in a 100 Khz bandwidth.

For the modified ASK, this frequency occurs around f=f0+fi, where 20.4% (–6.9 dB) of the power is in a 100 Khz bandwidth.

The difference in 100 Khz bandwidth for those worst points is 4 dB of the total power.

The present invention has been described in the context of apparatus for monitoring passage of vehicles over a toll road. However, it will be appreciated by persons skilled in the art that the present invention is equally useful in the context of other toll facilities, i.e. any type of for-pay facilities employed by a plurality of users such as persons or such as land, sea or air vehicles, for example lot parking and curb parking for land vehicles or theater or other entertainment facilities for persons.

The present invention has been described by describing certain functions which are performed by local vehicle passage monitors and other functions which are performed by a central control unit. It is appreciated that the functions described herein as being performed by the local and central units may, in fact, be apportioned in any suitable manner between per-lane units, per-road units, and other central units of varying degrees of centrality, such as per-neighborhood units, per-city units, per-county units and per-state units.

It is appreciated that various features of the invention which are, for clarity, described in the contexts of separate embodiments may also be provided in combination in a single embodiment. Conversely, various features of the invention which are, for brevity, described in the context of a single embodiment, such as nonsimultaneous reader operation for adjacent lanes, probabilistic vehicle tag transmission, authentication by means of a fluctuating account identification code, optical transmission from the reader to the vehicle tag, nonsimultaneous operation of tags arriving at adjacent lanes, nonsimultaneous operation of lane monitors and provision of a dual state local oscillator, may each be provided separately or in any suitable subcombination.

A particular advantage of the system shown and described herein is that the nonsimultaneous reader operation feature, the authentication feature and the dual state local oscillator feature may be provided for operation even with tags which lack the novel features shown and described herein. Conversely, the probabilistic vehicle tag transmission feature may be provided for operation even with readers which lack the novel features shown and described herein.

It will be appreciated by persons skilled in the art that the present invention is not limited to what has been particularly shown and described hereinabove. Rather, the scope of the present invention is defined only by the claims that follow:

We claim:

1. A backscattering transponder comprising:

a modulator/demodulator;

an antenna operative to transmit modulated data generated by the modulator/demodulator; and antenna switching apparatus which switches the antenna between the modulator/demodulator and ground such that when the antenna is in a receiving mode, the antenna is connected to the modulator/demodulator and such that, when the antenna is in a transmitting mode, the antenna is switched between the modulator/demodulator and ground according to the modulated data.

2. A transponder according to claim 1 wherein the antenna switching apparatus comprises at least one diode.

3. A transponder according to claim 2 wherein the antenna switching apparatus comprises a single diode.

* * * * *